United States Patent
Reznik et al.

(10) Patent No.: US 9,118,898 B2
(45) Date of Patent: Aug. 25, 2015

(54) 8-POINT TRANSFORM FOR MEDIA DATA CODING

(75) Inventors: Yuriy Reznik, Seattle, WA (US); Rajan L. Joshi, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 123 days.

(21) Appl. No.: 12/820,312

(22) Filed: Jun. 22, 2010

(65) Prior Publication Data

US 2010/0329329 A1    Dec. 30, 2010

Related U.S. Application Data

(60) Provisional application No. 61/219,891, filed on Jun. 24, 2009.

(51) Int. Cl.
| | |
|---|---|
| H04N 7/12 | (2006.01) |
| H04N 19/625 | (2014.01) |
| G06F 17/14 | (2006.01) |
| H04N 19/60 | (2014.01) |

(52) U.S. Cl.
CPC ........ H04N 19/00812 (2013.01); G06F 17/147 (2013.01); H04N 19/60 (2014.11); H04N 19/625 (2014.11)

(58) Field of Classification Search
USPC ...................................... 375/240.2
See application file for complete search history.

(56) References Cited

U.S. PATENT DOCUMENTS

| | | | |
|---|---|---|---|
| 4,754,491 A | 6/1988 | Mischler et al. | |
| 5,278,646 A | 1/1994 | Civanlar et al. | |
| 5,408,425 A | 4/1995 | Hou | |
| 5,508,949 A | 4/1996 | Konstantinides | |
| 5,649,077 A | 7/1997 | On et al. | |

(Continued)

FOREIGN PATENT DOCUMENTS

| | | |
|---|---|---|
| CN | 1428719 A | 7/2003 |
| CN | 1436004 A | 8/2003 |

(Continued)

OTHER PUBLICATIONS

Huang et al., "An Array-based Scalable Architecture for DCT Computations in Video Coding," IEEE International Conference Neural Networks & Signal Processing, Zhenjiang, China, Jun. 8-10, 2000, pp. 451-455.

(Continued)

*Primary Examiner* — Richard Torrente
(74) *Attorney, Agent, or Firm* — Brent A. Boyd

(57) ABSTRACT

In general, techniques are described for implementing an 8-point inverse discrete cosine transform (IDCT). An apparatus comprising an 8-point inverse discrete cosine transform (IDCT) hardware unit may implement these techniques to transform media data from a frequency domain to a spatial domain. The 8-point IDCT hardware unit includes an even portion comprising factors A, B that are related to a first scaled factor ($\mu$) in accordance with a first relationship. The 8-point IDCT hardware unit also includes an odd portion comprising third, fourth, fifth and sixth internal factors (G, D, E, Z) that are related to a second scaled factor ($\eta$) in accordance with a second relationship. The first relationship relates the first scaled factor to the first and second internal factors. The second relationship relates the second scaled factor to the third, fourth, fifth and sixth internal factors.

27 Claims, 6 Drawing Sheets

(56) References Cited

U.S. PATENT DOCUMENTS

| | | | |
|---|---|---|---|
| 5,737,450 A | 4/1998 | Hajjahmad et al. | |
| 5,768,167 A | 6/1998 | Kuroda | |
| 5,959,675 A | 9/1999 | Mita et al. | |
| 6,029,185 A | 2/2000 | Tonomura | |
| 6,252,994 B1 | 6/2001 | Nafarieh | |
| 7,366,236 B1 | 4/2008 | Winger | |
| 7,412,100 B2 | 8/2008 | Raveendran et al. | |
| 7,437,394 B2 | 10/2008 | Hou | |
| 7,725,516 B2 | 5/2010 | Liu | |
| 2001/0054051 A1 | 12/2001 | Tajime | |
| 2002/0106020 A1 | 8/2002 | Cheng et al. | |
| 2003/0076904 A1 | 4/2003 | Magee | |
| 2003/0078952 A1 | 4/2003 | Kim et al. | |
| 2003/0078953 A1 | 4/2003 | Hallapuro et al. | |
| 2003/0093452 A1* | 5/2003 | Zhou | 708/520 |
| 2003/0133507 A1 | 7/2003 | Miro et al. | |
| 2003/0152281 A1 | 8/2003 | Tomita et al. | |
| 2003/0177158 A1 | 9/2003 | Zheltov et al. | |
| 2004/0136602 A1 | 7/2004 | Nagaraj et al. | |
| 2005/0069035 A1 | 3/2005 | Lu et al. | |
| 2005/0141609 A1 | 6/2005 | Malvar | |
| 2005/0213835 A1 | 9/2005 | Guangxi et al. | |
| 2005/0281331 A1 | 12/2005 | Hahm et al. | |
| 2006/0126962 A1 | 6/2006 | Sun | |
| 2006/0165164 A1 | 7/2006 | Kwan et al. | |
| 2007/0025441 A1 | 2/2007 | Ugur et al. | |
| 2007/0156398 A1* | 7/2007 | Hung et al. | 704/229 |
| 2007/0168410 A1 | 7/2007 | Reznik | |
| 2007/0200738 A1 | 8/2007 | Reznik et al. | |
| 2007/0233764 A1* | 10/2007 | Reznik et al. | 708/402 |
| 2007/0297503 A1* | 12/2007 | Reznik | 375/240 |
| 2008/0037656 A1 | 2/2008 | Hannuksela | |
| 2008/0049834 A1 | 2/2008 | Holcomb et al. | |
| 2009/0080515 A1 | 3/2009 | Nagaraj et al. | |
| 2009/0086816 A1 | 4/2009 | Leontaris et al. | |
| 2009/0141808 A1 | 6/2009 | Wong | |
| 2009/0157785 A1 | 6/2009 | Reznik et al. | |
| 2009/0180700 A1 | 7/2009 | Kim et al. | |
| 2010/0172409 A1 | 7/2010 | Reznik et al. | |
| 2010/0266008 A1 | 10/2010 | Reznik | |
| 2010/0309974 A1 | 12/2010 | Reznik | |
| 2010/0312811 A1 | 12/2010 | Reznik | |
| 2011/0026846 A1 | 2/2011 | Hsu et al. | |
| 2011/0150078 A1 | 6/2011 | Reznik et al. | |
| 2011/0150079 A1 | 6/2011 | Reznik et al. | |
| 2011/0153699 A1 | 6/2011 | Reznik et al. | |
| 2012/0177108 A1 | 7/2012 | Joshi et al. | |
| 2013/0121406 A1 | 5/2013 | Reznik et al. | |
| 2013/0148718 A1 | 6/2013 | Reznik et al. | |

FOREIGN PATENT DOCUMENTS

| | | |
|---|---|---|
| CN | 1455599 A | 11/2003 |
| CN | 1149499 C | 5/2004 |
| CN | 1617594 A | 5/2005 |
| CN | 1791222 A | 6/2006 |
| CN | 101047849 A | 10/2007 |
| CN | 101330616 A | 12/2008 |
| EP | 0917070 A2 | 5/1999 |
| EP | 1359546 A1 | 11/2003 |
| JP | H09212484 A | 8/1997 |
| JP | 2003223433 A | 8/2003 |
| JP | 2003281115 A | 10/2003 |
| JP | 2007129731 A | 5/2007 |
| KR | 1020010043396 | 5/2001 |
| KR | 100545445 B1 | 1/2006 |
| KR | 20060112255 A | 10/2006 |
| TW | 284869 A | 9/1996 |
| TW | I241074 B | 10/2005 |
| TW | 200714076 A | 4/2007 |
| TW | 200727578 | 7/2007 |
| TW | 200741486 A | 11/2007 |
| TW | 200801980 | 1/2008 |
| TW | I295455 B | 4/2008 |
| TW | I310526 B | 6/2009 |
| WO | 9910818 A1 | 3/1999 |
| WO | 0159603 A1 | 8/2001 |
| WO | 03019949 A2 | 3/2003 |
| WO | WO-03019787 A2 | 3/2003 |
| WO | 2009039451 A2 | 3/2009 |
| WO | 2009042943 A2 | 4/2009 |
| WO | 2011005583 A2 | 1/2011 |

OTHER PUBLICATIONS

Rao et al., "Discrete Cosine Transform: Algorithms, Advantages, Applications", Academic Press, San Diego, 1990.

Britanak et al., "Discrete Cosine and Sine Transforms: General Properties, Fast Algorithms and Integer Approximations", Academic Press, 2006.

Cham, "Development of integer cosine transforms by the principle of dyadic symmetry," Communications, Speech and Vision, IEE Proceedings I , vol. 136, No. 4, pp. 276-282, Aug. 1989.

Reznik et al., "Improved Precision of Fixed-Point Algorithms by Means of Common Factors," Proc. ICIP 2008, San Diego, CA.

Reznik et al., "On Design of Transforms for High-Resolution / High-Performance Video Coding, MPEG input document M16438," MPEG's 88th meeting, Maui, HI, Apr. 2009.

Reznik et al., "Efficient Fixed-Point Approximations of 8x8 Inverse Discrete Cosine Transform," Applications of Digital Image Processing XXX, vol. 6696, Oct. 8, 2007, 17 pp.

Loeffler, "Algorithm-architecture mapping for custom DCT chips." in Proc. Int. Symp. Circuits Syst. (Helsinki, Finland), Jun. 1988, pp. 1953-1956.

Liang, "Fast Multiplierless Approximations of the DCT With the Lifting Scheme," IEEE Transactions on Signal Processing, vol. 49, No. 12, Dec. 2001, pp. 3032-3044.

Sullivan, "Standardization of IDCT approximation behavior for video compression: the history and the new MPEG-C parts 1 and 2 standards," Applications of Digital Image Processing XXX vol. 6696, 2007, 22 pp.

Loeffler et al., "Practical Fast 1-D DCT Algorithms With 11 Multiplications," IEEE, 1989, pp. 988-991.

Fuldseth a., et al., "Transform design for HEVC with 16 bit intermediate data representation", ITU-T SG16 WP3 and ISO/IEC JTC1/SC29/WG11, Document JCTVC-E243, 5TH JCT-VC Meeting, Mar. 16-23, 2011, Geneva, CH, No. JCTVC-E243, Mar. 18, 2011, pp. 1-16; XP030048334.

Fuldseth a., et al., "Unified transform design for HEVC with 16 bit intermediate data representation", ITU-T SG16 WP3 and ISO/IEC JTC1/SC29/WG11, Document JCTVCD224, 4TH JCT-VC Meeting, Jan. 20-28, 2011, Daegu, KR, No. JCTVC-D224, Jan. 15, 2011, pp. 1-7; XP030008264, ISSN: 0000-0013.

Josh I, et al., "Efficient 16 and 32-point transforms," Joint Collaborative Team on Video Coding (JCT-VC) of ITU-T SG16 WP3 and ISO 6G16 WP3 and ISO.IEC JTCl/SC29/WG11, 4th Meeting: Daegu, KR, Jan. 20-28, 2011, 8 pp.

Joshi R et al: "CE10: Scaled orthogonal integer transforms supporting recursive factorization structure", 5. JCT-VC Meeting; 96. MPEG Meeting; Mar. 16, 2011-Mar. 23, 2011; Geneva; (Joint Collaborative Team on Video Coding of ISO/IEC JTC1/ SC29/WG11AND ITU-T SG. 16); URL:HTTP://WFTP3.ITU.INT/AV-ARCH/JC TVC-Site/, No. JCTVC-E370, Mar. 11, 2011, 8 pp.; XP030008876, ISSN: 0000-0005 the whole document.

Joshi R., et al., "CE10: Scaled orthogonal integer transforms supporting recursive factorization structure", ITU-T SG16 WP3 and ISO/IEC JTC1/SC29/WG11, Document JCTVC-F352 R1, 6TH JCT-VC Meeting, Jul. 14-22, 2011, Torino, IT, No. JCTVC-F352 R1, Jul. 12, 2011, 12 pp.; XP030049338.

Joshi R., et al., "Recursive factorization for 16 and 32-point transforms using 4 and 8-point HM 3.0 core transforms", ITU-T SG16 WP3 and ISO/IEC JTC1/SC29/WG11, Document JCTVC F592, 6TH JCT-VC Meeting, Jul. 14-22, 2011, Torino, IT, No. JCTVC-F592, Jul. 18, 2011, 4 pp.; XP030049589.

(56) References Cited

OTHER PUBLICATIONS

Reznik, Y.A. et al., "Low-Drift Fixed-Point 8x8 IDCT Approximation with 8-Bit Transform Factors", Image Processing, 2007. ICIP 2007. IEEE International Conference on, IEEE, PI , Sep. 1, 2007, pp. VI-81, XP031158267, ISBN: 978-14244-1436-9 the whole document.
Sadafale M., et al., "Low-complexity configurable transform architecture for HEVC", ITU-T SG16 WP3 and ISO/IEC JTC1/SC29/WG11, Document JCTVC-C226, 3RD JCT-VC Meeting, Oct. 7-15, 2010, Guangzhou, CN, No. JCTVC-C226, Oct. 2, 2010, 4 pp.; XP030007933, ISSN: 0000-0019.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
Wiegand T et al.," WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.
Artieri A., et al., "A one chip VLSI for real time two-dimensional discrete cosine transform", 1988 IEEE International Symposium on Circuits and Systems (ISCAS'88), Jun. 7-9, 1988, Espoo, Finland, Jun. 7, 1988, pp. 701-704, XP010069645.
Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, Ch, Nov. 21-30, 2011, pp. 259.
Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d21, pp. 290.
Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, 11-20 Jul. 2012, JCTVC-J1003_d7, pp. 261.
Bross et al., "WD4: Working Draft 4 of High-Efficiency Video Coding," JCTVC-F803_d2, (JCT-VC) of ITU-T SG16 WP3 and iso/iec JTC1/SC29/WG11 Joint Collaborative Team on Video Coding, 6th Meeting, Torino, IT, Jul. 14-22, 2011, 226 pages.
Bross et al., "WD5: Working Draft 5 of High-Efficiency Video Coding," JCTVC-G1103_d2, (JCT-VC) of ITU-T SG16 WP3 and iso/iec JTC1/SC29/WG11 Joint Collaborative Team on Video Coding, 7th Meeting, Geneva, Switzerland (Nov. 2011), 214 pages.
Chan, et al., "Direct methods for computing discrete sinusoidal transforms," Proc. IEE, vol. 137, Pt. F, No. 6, pp. 433-442, Dec. 1990.
Chan S-C et al: "Fast algorithms for computing the discrete cosine transform", IEEE Transactions on Circuits and Systems ii: Analog and Digital Signal Processing, vol. 39, No. 3, Mar. 1992, pp. 185-190, XP000305256, ISSN: 1057-7130, DOI: 10.1109/82.127302.
Chivukula R K: "Fast algorithms for MDCT and low delay filterbanks used in audio coding", Master's Thesis, Electrical Engineering, The University of Texas at Arlington, USA, Aug. 8, 2008, XP007906591,Retrieved from the Internet:URL:http://dspace.uta.edu/handle/10106/921.
Dai X et al: "Fast algorithm for modulated complex lapped transform", IEEE Signal Processing Letters, vol. 16, No. 1, Jan. 2009, pp. 30-33, XP011239818, ISSN: 1070-9908, DOI : 10.1109/LSP.2008. 2008434.
Dong et al., "2-D order-16 integer transforms for HD video coding", IEEE Transactions on Circuits and Systems for Video Technology, Oct. 2009, pp. 1462-1474, vol. 19, No. 10, XP011270110, ISSN: 1051-8215, DOI: 10. 1109/TCSVT.2009.2026792.
Feig E et al: "Scaled DCT's on input sizes that are composite", IEEE Transactions on Signal Processing, vol. 43, No. 1, Jan. 1995, pp. 43-50, XP000826361, I SSN: 1053-587X, DOI: 10.1109/78.365284.
Feig E., et al., "On the Multiplicative Complexity of Discrete Cosine Transforms (Corresp.)" IEEE Transactions on Information Theory, vol. 38, No. 4, pp. 1387-1391, (Jul. 1992).
Graps, "An Introduction to Wavelets," IEEE Computational Science and Engineering , Summer 1995, vol. 2, No. 2, 18 PP.

Heideman, M.T.: "Computation of an Odd-Length DCT from a Real-Valued DFT of the Same Length," IEEE Transactions on Signal Processing, IEEE Service Center, New York, NY, US, vol. 40, No. 1, pp. 54-64 (Jan. 1, 1992) XP000270173 ISSN: 1053-587X.
International Search Report and Written Opinion—PCT/US2010/039657—ISA/EPO—Apr. 5, 2012.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Joshi et al., "Efficient large size transforms for high-performance video coding", Applications of Digital Image Processing XXXIII, Sep. 7, 2010, pp. 77980W-1-77980W-7, vol. 7798, Proceedings of SPIE, XP055007446, ISSN: 0277-786X, DOI: 10.1117/12.862250.
Josh! et al., "Simplified transforms for extended block sizes", ITU-T SG16 Q6 (VCEG), Document VCEG-AL30, 38TH VCEG Meeting, Jul. 6-10, 2009, Geneva, CH, Jul. 3, 2009, XP030003711, Retrieved from the Internet: URL: http://wftp3.itu.int/av-arch/video-site/0906_LG/VCEG-AL30.zip.
Karczewicz et al., "A hybrid video coder based on extended macroblock sizes, improved interpolation, and flexible motion representation", IEEE Transactions on Circuits and Systems for Video Technology, Dec. 2010, pp. 1698-1708, vol. 20, No. 12, XP011329406, ISSN: 1051-8215, DOI: 10. 1109/TCSVT.2010. 2092614.
Karczewicz et al., "Video coding technology proposal by Qualcomm", ITU-T SG16 WP3 and ISO/IEC JTC1/SC29/WG11, Document JCTVC-A121, 1ST JCT-VC Meeting, Apr. 15-23, 2010, Dresden, Germany, May 18, 2010, pp. 1-24, XP030007567, Retrieved from the Internet: URL: http://wftp3.itu.int/av-arch/jctvcsite/2010_042010_A2010_Dresden/JCTVC-A121.zip.
Kok, C.W.: "Fast Algorithm for Computing Discrete Cosine Transform," IEEE Transactions on Signal Processing, IEEE Service Center, New York, NY, US, vol. 45, No. 3 , XP011057726 ISSN: 1053-587X, pp. 757-760 (Mar. 1, 1997).
Malvar H.S., et al., "Low-Complexity Transform and Quantization in H.264/AVC," IEEE Transactions on Circuits and Systems for Video Technology, Jul. 2003, pp. 598-603, vol. 13 (7), XP011099252, ISSN: 1051-8215, DOI: 10.11091 TCSVT.2003.814964.
Ohm et al., "Special Section on the Joint Call for Proposals on High Efficiency Video Coding (HEVC) Standardization", IEEE Transactions on Circuits and Systems for Video Technology, Dec. 2010, pp. 1661-1666, vol. 20, No. 12, XP011334854, ISSN: 1051-8215, DOI: 10. 1109/TCSVT.2010.2095692.
Plonka et al., "Fast and numerically stable algorithms for discrete cosine transforms", Linear Algebra and Applications, Jan. 2005, pp. 309-345, vol. 394 No. 1, XP004613691, ISSN: 0024-3795, DOI: 10.1016/J. LAA.2004.07.015.
Rao, et al., "Discrete Cosine Transform: Algorithms, Advantages, Applications," Academic Press, San Diego, 1990, 490 pp.
Reznik Y a et al: "Design of fast transforms for high-resolution image and video coding", Applications of Digital Image Processing XXXII, Proceedings of SPIE, vol. 7443, Sep. 2, 2009, pp. 744312-1-744312-17, XP55007444.
Reznik Y a et al: "Fast 15x15 transform for image and video coding applications", Data Compression Conference 2009 (DCC '09), Mar. 16-18, 2009, Snowbird, UT, USA, Mar. 16, 2009, p. 465, XP031461157, ISBN: 978-1-4244-3753-5.
Reznik Y A: "On fast algorithm for computing even-length DCT", arXiv: 1001.3713v1 [cs.DS], Jan. 21, 2010, XP55007457, Retrieved from the Internet: URL: http://arxi v.org/PS-cache/arxiv/pdf/1001/1001.3713v1. pdf [retrieved on 2011-09-19].
Reznik Y.A., et al., "On complexity of size 960 transform in AAC family of codecs", ISO/IEC JTC1/SC29/WG11 M16443, Apr. 2009, Maui, HI, USA, Apr. 17, 2009, XP030045040, section 2.
Tan Li et al: "A unified computing kernel for MDCT/IMDCT in modern audio coding standards", Proceedings of International Symposium on Communications and Information Technologies 2007 (ISCIT 07), Oct. 17-19, 2007, Sidney, Australia, Oct. 17, 2007, pp. 546-550, XP031166524, DOI: 10.1109/ISCIT.2007.4392079 ISBN: 978-1-4244-0976-1.

(56) References Cited

OTHER PUBLICATIONS

Wiegand et al., "WD3: Working Draft 3 of High-Efficiency Video Coding," Document JCTVC-E603, 5th Meeting: Geneva, CH, Mar. 16-23, 2011,193 pp.

Wiegand T. et al., "WD2: Working Draft 2 of High-Efficiency Video Coding", 20110128, No. JCTVC-D503, Jan. 28, 2011, XP002679642, Retrieved from the Internet: URL: http://wftp3.itu.int/av-arch/jctvcsite/2011_01_D_Daegu/ [retrieved on Jul. 11, 2012].

Xiong et at., "A Comparative Study of DCT-and Wavelet-Based image Coding," IEEE Transactions on Circuits and Systems for Video Technology. vol. 9, No. 5, Aug. 1999, pp. 692-695.

Yuriy Reznik, et al., "Fast Algorithms for Computation of 5-Point DCT-II, DCT-IV, and DST-IV, and Architectures," U.S. Appl. No. 12/334,238. Dec. 12, 2008.

Yuriy Reznik, et al., "Low-Complexity Transforms for Data Compression and Decompression," US Application No. 12/349,406. Jan. 6, 2009.

Taiwan Search Report—TW099120666—TIPO—Apr. 13, 2013.

Beaulieu, et al., "Multi-Spectral Image Resolution Refinement Using Stationary Wavelet Transform With Marginal and Joint Statistics Modeling," Department de R-D, Centre de Recherche Informatique de Montreal, pp. 9. Geoscience and Remote Sensing Symposium 2003, IGARSS'03.

Hong Y.M., et al., "Low-complexity 16x16 and 32x32 transforms and partial frequency transform," JCTVC-C209, Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, pp. 1-11.

* cited by examiner

8-POINT TRANSFORM FOR MEDIA DATA CODING

This application claims the benefit of U.S. Provisional Application No. 61/219,891, filed Jun. 24, 2009, the entire content of which is incorporated herein by reference.

The present application for patent is related to the following co-pending U.S. patent application:

8-POINT TRANSFORM FOR MEDIA DATA CODING, having filed concurrently herewith, assigned to the assignee hereof and expressly incorporated by reference herein

TECHNICAL FIELD

This disclosure relates to data compression and, more particularly, data compression involving transforms.

BACKGROUND

Data compression is widely used in a variety of applications to reduce consumption of data storage space, transmission bandwidth, or both. Example applications of data compression include visible or audible media data coding, such as digital video, image, speech, and audio coding. Digital video coding, for example, is used in a wide range of devices, including digital televisions, digital direct broadcast systems, wireless communication devices, personal digital assistants (PDAs), laptop or desktop computers, digital cameras, digital recording devices, video gaming devices, cellular or satellite radio telephones, or the like. Digital video devices implement video compression techniques, such as MPEG-2, MPEG-4, or H.264/MPEG-4 Advanced Video Coding (AVC), to transmit and receive digital video more efficiently.

In general, video compression techniques perform spatial prediction, motion estimation and motion compensation to reduce or remove redundancy inherent in video data. In particular, intra-coding relies on spatial prediction to reduce or remove spatial redundancy in video within a given video frame. Inter-coding relies on temporal prediction to reduce or remove temporal redundancy in video within adjacent frames. For inter-coding, a video encoder performs motion estimation to track the movement of matching video blocks between two or more adjacent frames. Motion estimation generates motion vectors, which indicate the displacement of video blocks relative to corresponding video blocks in one or more reference frames. Motion compensation uses the motion vector to generate a prediction video block from a reference frame. After motion compensation, a residual video block is formed by subtracting the prediction video block from the original video block.

A video encoder then applies a transform followed by quantization and lossless statistical coding processes to further reduce the bit rate of the residual block produced by the video coding process. In some instances, the applied transform comprises a discrete cosine transform (DCT) applied in the horizontal and vertical directions separately. Typically, the DCT is applied to video blocks whose size is a power of two, such as a video block that is 4 pixels high by 4 pixels wide (which is often referred to as a "4×4 video block"). Often, the DCT is a one-dimensional or linear DCT, which is applied first to the rows of the video block and then to the columns of the video block. These one-dimensional (1D) DCTs may therefore be referred to as 4-point DCTs in that these DCTs are applied to 4×4 video blocks to produce a 4×4 matrix of DCT coefficients. The 4×4 matrix of DCT coefficients produced from applying a 4-point DCT to the residual block then undergo quantization and lossless statistical coding processes (commonly known as "entropy coding" processes) to generate a bitstream. Examples of statistical coding processes include context-adaptive variable length coding (CAVLC) or context-adaptive binary arithmetic coding (CABAC). A video decoder receives the encoded bitstream and performs lossless decoding to decompress residual information for each of the blocks. Using the residual information and motion information, the video decoder reconstructs the encoded video.

SUMMARY

In general, this disclosure is directed to techniques for coding data, such as media data, using one or more implementations of an 8-point discrete cosine transform (DCT) that may provide increased coding gain relative to conventional 8-point DCTs. The implementations of the 8-point DCT applied in accordance with the techniques of this disclosure involve various relationships between scaled factors and internal factors. The term "scaled factors" refers to factors external from the implementation of the 8-point DCT that are removed through factorization. The term "internal factors" refers to factors internal to the implementation of the 8-point DCT that remain after factorization. One example implementation of the 8-point DCT is orthogonal, which implies that the matrix of coefficients representative of the 8-point DCT, when multiplied by a transpose of this matrix, equals the identity matrix. Another example implementation of the 8-point DCT is near-orthogonal (or approximately orthogonal). By adhering to the various relationships described in detail below, the techniques facilitate selection of matrix coefficients in both instances that result in orthogonal and near-orthogonal 8-point DCT implementations, which, when applied to data, may promote increased coding gain relative to conventional 8-point DCTs.

In one aspect, a method comprises receiving media data with a coding device and performing a 8-point discrete cosine transform (DCT) with an 8-point DCT hardware unit of the coding device to transform the received media data from a spatial domain to a frequency domain. The 8-point DCT hardware unit includes an even portion comprising first and second internal factors (A, B) that are related to a first scaled factor ($\mu$) in accordance with a first relationship, wherein the first relationship is defined such that the first scaled factor equals a square root of a sum of a square of the first internal factor plus a square of the second internal factor, and an odd portion comprising third, fourth, fifth and sixth internal factors (G, D, E, Z) that are related to a second scaled factor ($\eta$) in accordance with a second relationship. The second relationship is defined such that the second scaled factor equals a square root of a sum of a square of the third internal factor plus a square of the fourth internal factor. The second relationship also is defined such that the second scaled factor equals a square root of a sum of a square of the fifth internal factor plus a square of the sixth internal factor.

In another aspect, an apparatus comprises an 8-point discrete cosine transform (DCT) hardware unit that transforms media data from a spatial domain to a frequency domain. The 8-point DCT hardware unit includes an even portion comprising first and second internal factors (A, B) that are related to a first scaled factor ($\mu$) in accordance with a first relationship, wherein the first relationship is defined such that the first scaled factor equals a square root of a sum of a square of the first internal factor plus a square of the second internal factor, and an odd portion comprising third, fourth, fifth and sixth internal factors (G, D, E, Z) that are related to a second scaled factor (η) in accordance with a second relationship. The second relationship is defined such that the second scaled factor equals a square root of a sum of a square of the third internal factor plus a square of the fourth internal factor. The second relationship also is defined such that the second scaled factor equals a square root of a sum of a square of the fifth internal factor plus a square of the sixth internal factor.

In another aspect, a device comprises means for receiving media data and means for performing a 8-point discrete cosine transform DCT to transform the received media data from a spatial domain to a frequency domain. The means for performing the 8-point DCT-II includes an even portion comprising first and second internal factors (A, B) that are related to a first scaled factor (μ) in accordance with a first relationship, wherein the first relationship is defined such that the first scaled factor equals a square root of a sum of a square of the first internal factor plus a square of the second internal factor, and an odd portion comprising third, fourth, fifth and sixth internal factors (G, D, E, Z) that are related to a second scaled factor (η) in accordance with a second relationship. The second relationship is defined such that the second scaled factor equals a square root of a sum of a square of the third internal factor plus a square of the fourth internal factor. The second relationship also is defined such that the second scaled factor equals a square root of a sum of a square of the fifth internal factor plus a square of the sixth internal factor.

In another aspect, a non-transitory computer-readable storage medium comprises instructions that cause a processor to receive media data with a coding device and perform a 8-point discrete cosine transform (DCT) with an 8-point DCT hardware unit of the coding device to transform the received media data from a spatial domain to a frequency domain. The 8-point DCT hardware unit includes an even portion comprising first and second internal factors (A, B) that are related to a first scaled factor (μ) in accordance with a first relationship, wherein the first relationship is defined such that the first scaled factor equals a square root of a sum of a square of the first internal factor plus a square of the second internal factor and an odd portion comprising third, fourth, fifth and sixth internal factors (G, D, E, Z) that are related to a second scaled factor (η) in accordance with a second relationship. The second relationship is defined such that the second scaled factor equals a square root of a sum of a square of the third internal factor plus a square of the fourth internal factor. The second relationship also is defined such that the second scaled factor equals a square root of a sum of a square of the fifth internal factor plus a square of the sixth internal factor.

In another aspect, a method comprises receiving media data with a coding device and performing an 8-point discrete cosine transform (DCT) with an 8-point DCT hardware unit of the coding device to transform the media data from a spatial domain to a frequency domain. The 8-point DCT hardware unit includes an even portion comprising first and second internal factors (A, B) that are related to a first scaled factor (μ) in accordance with a first relationship, wherein the first relationship is defined such that the first scaled factor equals a sum of the first internal factor plus the second internal factor divided by a sum of a first approximation (α) of a cosine of three times a constant pi (π) divided by eight plus a second approximation (β) of a sine of three times the constant pi (π) divided by eight. The 8-point DCT hardware also unit includes an odd portion comprising third, fourth, fifth and sixth internal factors (G, D, E, Z) that are related to a second scaled factor (η) in accordance with a second relationship. The second relationship is defined such that the second scaled factor equals one of the following equations that results in a minimal error: (1) a sum of the third internal factor (G) plus the fourth internal factor (D) divided by a sum of a third approximation (γ) of a cosine of the constant pi divided by sixteen plus a fourth approximation (δ) of a sine of the constant pi divided by sixteen, (2) a sum of the third internal factor (G) plus the fifth internal factor (E) divided by a sum of the third approximation (γ) plus a fifth approximation (ε) of a cosine of three times the constant pi divided by 16, (3) a sum of the third internal factor (G) plus the sixth internal factor (Z) divided by a sum of the third approximation (γ) plus a sixth approximation (ζ) of a sine of three times the constant pi divided by 16, (4) a sum of the fourth internal factor (D) plus the fifth internal factor (E) divided by a sum of the fourth approximation (δ) plus the fifth approximation (ε), (5) a sum of the fourth internal factor (D) plus the sixth internal factor (Z) divided by a sum of the fourth approximation (δ) plus the sixth approximation (ζ), and (6) a sum of the fifth internal factor (E) plus the sixth internal factor (Z) divided by a sum of the fifth approximation (ε) plus the sixth approximation (ζ).

In another aspect, an apparatus comprises an 8-point discrete cosine transform (DCT) hardware unit that transforms media data from a spatial domain to a frequency domain. The 8-point DCT hardware unit includes an even portion comprising first and second internal factors (A, B) that are related to a first scaled factor (μ) in accordance with a first relationship, wherein the first relationship is defined such that the first scaled factor equals a sum of the first internal factor plus the second internal factor divided by a sum of a first approximation (α) of a cosine of three times a constant pi (π) divided by eight plus a second approximation (β) of a sine of three times the constant pi (π) divided by eight. The 8-point DCT hardware unit includes an odd portion comprising third, fourth, fifth and sixth internal factors (G, D, E, Z) that are related to a second scaled factor (η) in accordance with a second relationship. The second relationship is defined such that the second scaled factor equals one of the following equations that results in a minimal error: (1) a sum of the third internal factor (G) plus the fourth internal factor (D) divided by a sum of a third approximation (γ) of a cosine of the constant pi divided by sixteen plus a fourth approximation (δ) of a sine of the constant pi divided by sixteen, (2) a sum of the third internal factor (G) plus the fifth internal factor (E) divided by a sum of the third approximation (γ) plus a fifth approximation (ε) of a cosine of three times the constant pi divided by 16, (3) a sum of the third internal factor (G) plus the sixth internal factor (Z) divided by a sum of the third approximation (γ) plus a sixth approximation (ζ) of a sine of three times the constant pi divided by 16, (4) a sum of the fourth internal factor (D) plus the fifth internal factor (E) divided by a sum of the fourth approximation (δ) plus the fifth approximation (ε), (5) a sum of the fourth internal factor (D) plus the sixth internal factor (Z) divided by a sum of the fourth approximation (δ) plus the sixth approximation (ζ), and (6) a sum of the fifth internal factor (E) plus the sixth internal factor (Z) divided by a sum of the fifth approximation (ε) plus the sixth approximation (ζ).

In another aspect, an apparatus comprises means for receiving media data, and means for performing an 8-point discrete cosine transform (DCT) to transform the media data from a spatial domain to a frequency domain. The means for performing the 8-point DCT includes an even portion comprising first and second internal factors (A, B) that are related to a first scaled factor (μ) in accordance with a first relationship, wherein the first relationship is defined such that the first scaled factor equals a sum of the first internal factor plus the second internal factor divided by a sum of a first approximation (α) of a cosine of three times a constant pi (π) divided by eight plus a second approximation (β) of a sine of three times the constant pi (π) divided by eight. The means for performing the 8-point DCT also includes an odd portion comprising third, fourth, fifth and sixth internal factors (G, D, E, Z) that are related to a second scaled factor (η) in accordance with a second relationship. The second relationship is defined such that the second scaled factor equals one of the following equations that results in a minimal error: (1) a sum of the third internal factor (G) plus the fourth internal factor (D) divided by a sum of a third approximation (γ) of a cosine of the constant pi divided by sixteen plus a fourth approximation (δ) of a sine of the constant pi divided by sixteen, (2) a sum of the third internal factor (G) plus the fifth internal factor (E) divided by a sum of the third approximation (γ) plus a fifth approximation (ε) of a cosine of three times the constant pi divided by 16, (3) a sum of the third internal factor (G) plus the sixth internal factor (Z) divided by a sum of the third approximation (γ) plus a sixth approximation (ζ) of a sine of three times the constant pi divided by 16, (4) a sum of the fourth internal factor (D) plus the fifth internal factor (E) divided by a sum of the fourth approximation (δ) plus the fifth approximation (ε), (5) a sum of the fourth internal factor (D) plus the sixth internal factor (Z) divided by a sum of the fourth approximation (ε) plus the sixth approximation (ζ), and (6) a sum of the fifth internal factor (E) plus the sixth internal factor (Z) divided by a sum of the fifth approximation (ε) plus the sixth approximation (ζ).

In another aspect, a non-transitory computer-readable storage medium comprises instructions that cause a processor to receive media data and perform an 8-point discrete cosine transform (DCT) with an 8-point DCT hardware unit to transform the media data from a spatial domain to a frequency domain. The 8-point DCT hardware unit includes an even portion comprising first and second internal factors (A, B) that are related to a first scaled factor (μ) in accordance with a first relationship, wherein the first relationship is defined such that the first scaled factor equals a sum of the first internal factor plus the second internal factor divided by a sum of a first approximation (α) of a cosine of three times a constant pi (π) divided by eight plus a second approximation (β) of a sine of three times the constant pi (π) divided by eight. The 8-point DCT hardware unit also includes an odd portion comprising third, fourth, fifth and sixth internal factors (G, D, E, Z) that are related to a second scaled factor (η) in accordance with a second relationship. The second relationship is defined such that the second scaled factor equals one of the following equations that results in a minimal error: (1) a sum of the third internal factor (G) plus the fourth internal factor (D) divided by a sum of a third approximation (γ) of a cosine of the constant pi divided by sixteen plus a fourth approximation (δ) of a sine of the constant pi divided by sixteen, (2) a sum of the third internal factor (G) plus the fifth internal factor (E) divided by a sum of the third approximation (γ) plus a fifth approximation (ε) of a cosine of three times the constant pi divided by 16, (3) a sum of the third internal factor (G) plus the sixth internal factor (Z) divided by a sum of the third approximation (γ) plus a sixth approximation (ζ) of a sine of thee times the constant pi divided by 16, (4) a sum of the fourth internal factor (D) plus the fifth internal factor (E) divided by a sum of the fourth approximation (δ) plus the fifth approximation (ε), (5) a sum of the fourth internal factor (D) plus the sixth internal factor (Z) divided by a sum of the fourth approximation (δ) plus the sixth approximation (ζ) and (6) a sum of the fifth internal factor (E) plus the sixth internal factor (Z) divided by a sum of the fifth approximation (ε) plus the sixth approximation (ζ).

In another aspect, a method comprises receiving coded media data with a coding device and performing a 8-point inverse discrete cosine transform (IDCT) with an 8-point IDCT hardware unit of the coding device to transform the received coded media data from a frequency domain to a spatial domain. The 8-point IDCT hardware unit includes an even portion comprising first and second internal factors (A, B) that are related to a first scaled factor (μ) in accordance with a first relationship, wherein the first relationship is defined such that the first scaled factor equals a square root of a sum of a square of the first internal factor plus a square of the second internal factor. The 8-point IDCT hardware unit also includes an odd portion comprising third, fourth, fifth and sixth internal factors (G, D, E, Z) that are related to a second scaled factor (η) in accordance with a second relationship. The second relationship is defined such that the second scaled factor equals a square root of a sum of a square of the third internal factor plus a square of the fourth internal factor. The second relationship also is defined such that the second scaled factor equals a square root of a sum of a square of the fifth internal factor plus a square of the sixth internal factor.

In another aspect, an apparatus comprises an 8-point inverse discrete cosine transform (IDCT) hardware unit that transforms coded media data from a frequency domain to a spatial domain. The 8-point IDCT hardware unit includes an even portion comprising first and second internal factors (A, B) that are related to a first scaled factor (μ) in accordance with a first relationship, wherein the first relationship is defined such that the first scaled factor equals a square root of a sum of a square of the first internal factor plus a square of the second internal factor. The 8-point IDCT hardware unit also includes an odd portion comprising third, fourth, fifth and sixth internal factors (G, D, E, Z) that are related to a second scaled factor (η) in accordance with a second relationship. The second relationship is defined such that the second scaled factor equals a square root of a sum of a square of the third internal factor plus a square of the fourth internal factor. The second relationship also is defined such that the second scaled factor equals a square root of a sum of a square of the fifth internal factor plus a square of the sixth internal factor.

In another aspect, a device comprises means for receiving coded media data and means for performing a 8-point inverse discrete cosine transform (IDCT) to transform the received coded media data from a frequency domain to a spatial domain. The means for performing the 8-point IDCT includes an even portion comprising first and second internal factors (A, B) that are related to a first scaled factor (μ) in accordance with a first relationship, wherein the first relationship is defined such that the first scaled factor equals a square root of a sum of a square of the first internal factor plus a square of the second internal factor. The means for performing the 8-point IDCT also includes an odd portion comprising third, fourth, fifth and sixth internal factors (G, D, E, Z) that are related to a second scaled factor (η) in accordance with a second relationship. The second relationship is defined such that the second scaled factor equals a square root of a sum of a square of the third internal factor plus a square of the fourth internal factor. The second relationship also is defined such that the second scaled factor equals a square root of a sum of a square of the fifth internal factor plus a square of the sixth internal factor.

In another aspect, a non-transitory computer-readable storage medium comprising instructions that cause a processor to receive coded media data with a coding device and perform a 8-point inverse discrete cosine transform (IDCT) with an 8-point IDCT hardware unit of the coding device to transform the received coded media data from a frequency domain to a spatial domain. The 8-point IDCT hardware unit includes an even portion comprising first and second internal factors (A, B) that are related to a first scaled factor (μ) in accordance with a first relationship, wherein the first relationship is defined such that the first scaled factor equals a square root of a sum of a square of the first internal factor plus a square of the second internal factor, and an odd portion comprising third, fourth, fifth and sixth internal factors (G, D, E, Z) that are related to a second scaled factor (η) in accordance with a second relationship. The second relationship is defined such that the second scaled factor equals a square root of a sum of a square of the third internal factor plus a square of the fourth internal factor. The second relationship also is defined such that the second scaled factor equals a square root of a sum of a square of the fifth internal factor plus a square of the sixth internal factor.

In another aspect, a method comprises receiving coded media data with a coding device and performing an 8-point inverse discrete cosine transform (IDCT) with an 8-point IDCT hardware unit of the coding device to transform the coded media data from a frequency domain to a spatial domain. The 8-point IDCT hardware unit includes an even portion comprising first and second internal factors (A, B) that are related to a first scaled factor (μ) in accordance with a first relationship, wherein the first relationship is defined such that the first scaled factor equals a sum of the first internal factor plus the second internal factor divided by a sum of a first approximation (α) of a cosine of three times a constant pi (π) divided by eight plus a second approximation (β) of a sine of three times the constant pi (π) divided by eight. The 8-point IDCT hardware unit also includes an odd portion comprising third, fourth, fifth and sixth internal factors (G, D, E, Z) that are related to a second scaled factor (η) in accordance with a second relationship. The second relationship is defined such that the second scaled factor equals one of the following equations that results in a minimal error: (1) a sum of the third internal factor (G) plus the fourth internal factor (D) divided by a sum of a third approximation (γ) of a cosine of the constant pi divided by sixteen plus a fourth approximation (δ) of a sine of the constant pi divided by sixteen, (2) a sum of the third internal factor (G) plus the fifth internal factor (E) divided by a sum of the third approximation (γ) plus a fifth approximation (ε) of a cosine of three times the constant pi divided by 16, (3) a sum of the third internal factor (G) plus the sixth internal factor (Z) divided by a sum of the third approximation (γ) plus a sixth approximation (ζ) of a sine of three times the constant pi divided by 16, (4) a sum of the fourth internal factor (D) plus the fifth internal factor (E) divided by a sum of the fourth approximation (δ) plus the fifth approximation (ε), (5) a sum of the fourth internal factor (D) plus the sixth internal factor (Z) divided by a sum of the fourth approximation (δ) plus the sixth approximation (ζ), and (6) a sum of the fifth internal factor (E) plus the sixth internal factor (Z) divided by a sum of the fifth approximation (ε) plus the sixth approximation (ζ).

In another aspect, an apparatus comprises an 8-point inverse discrete cosine transform (IDCT) hardware unit that transforms coded media data from a frequency domain to a spatial domain. The 8-point IDCT hardware unit includes an even portion comprising first and second internal factors (A, B) that are related to a first scaled factor (μ) in accordance with a first relationship, wherein the first relationship is defined such that the first scaled factor equals a sum of the first internal factor plus the second internal factor divided by a sum of a first approximation (α) of a cosine of three times a constant pi (π) divided by eight plus a second approximation (β) of a sine of three times the constant pi (π) divided by eight. The 8-point IDCT hardware unit also includes an odd portion comprising third, fourth, fifth and sixth internal factors (G, D, E, Z) that are related to a second scaled factor (η) in accordance with a second relationship. The second relationship is defined such that the second scaled factor equals one of the following equations that results in a minimal error: (1) a sum of the third internal factor (G) plus the fourth internal factor (D) divided by a sum of a third approximation (γ) of a cosine of the constant pi divided by sixteen plus a fourth approximation (δ) of a sine of the constant pi divided by sixteen, (2) a sum of the third internal factor (G) plus the fifth internal factor (E) divided by a sum of the third approximation (γ) plus a fifth approximation (ε) of a cosine of three times the constant pi divided by 16, (3) a sum of the third internal factor (G) plus the sixth internal factor (Z) divided by a sum of the third approximation (γ) plus a sixth approximation (ζ) of a sine of three times the constant pi divided by 16, (4) a sum of the fourth internal factor (D) plus the fifth internal factor (E) divided by a sum of the fourth approximation (δ) plus the fifth approximation (ε), (5) a sum of the fourth internal factor (D) plus the sixth internal factor (Z) divided by a sum of the fourth approximation (δ) plus the sixth approximation (ζ), and (6) a sum of the fifth internal factor (E) plus the sixth internal factor (Z) divided by a sum of the fifth approximation (ε) plus the sixth approximation (ζ).

In another aspect, an apparatus comprises means for receiving coded media data, and means for performing an 8-point inverse discrete cosine transform (IDCT) to transform the coded media data from a frequency domain to a spatial domain. The means for performing the 8-point IDCT includes an even portion comprising first and second internal factors (A, B) that are related to a first scaled factor (μ) in accordance with a first relationship, wherein the first relationship is defined such that the first scaled factor equals a sum of the first internal factor plus the second internal factor divided by a sum of a first approximation (α) of a cosine of three times a constant pi (π) divided by eight plus a second approximation (β) of a sine of three times the constant pi (π) divided by eight. The means for performing the 8-point IDCT also includes an odd portion comprising third, fourth, fifth and sixth internal factors (G, D, E, Z) that are related to a second scaled factor (η) in accordance with a second relationship. The second relationship is defined such that the second scaled factor equals one of the following equations that results in a minimal error: (1) a sum of the third internal factor (G) plus the fourth internal factor (D) divided by a sum of a third approximation (γ) of a cosine of the constant pi divided by sixteen plus a fourth approximation (δ) of a sine of the constant pi divided by sixteen, (2) a sum of the third internal factor (G) plus the fifth internal factor (E) divided by a sum of the third approximation (γ) plus a fifth approximation (ε) of a cosine of three times the constant pi divided by 16, (3) a sum of the third internal factor (G) plus the sixth internal factor (Z) divided by a sum of the third approximation (γ) plus a sixth approximation (ζ) of a sine of three times the constant pi divided by 16, (4) a sum of the fourth internal factor (D) plus the fifth internal factor (E) divided by a sum of the fourth approximation (δ) plus the fifth approximation (ε), (5) a sum of the fourth internal factor (D) plus the sixth internal factor (Z) divided by a sum of the fourth approximation (δ) plus the sixth approximation (ζ), and (6) a sum of the fifth internal factor (E) plus the sixth internal factor (Z) divided by a sum of the fifth approximation (ε) plus the sixth approximation (ζ).

In another aspect, a non-transitory computer-readable storage medium comprising instructions that cause a processor to receive coded media data and perform an 8-point inverse discrete cosine transform (IDCT) with an 8-point IDCT hardware unit to transform the coded media data from a frequency domain to a spatial domain. The 8-point IDCT hardware unit includes an even portion comprising first and second internal factors (A, B) that are related to a first scaled factor (μ) in accordance with a first relationship, wherein the first relationship is defined such that the first scaled factor equals a sum of the first internal factor plus the second internal factor divided by a sum of a first approximation (α) of a cosine of three times a constant pi (π) divided by eight plus a second approximation (β) of a sine of three times the constant pi (π) divided by eight. The 8-point IDCT hardware unit also includes an odd portion comprising third, fourth, fifth and sixth internal factors (G, D, E, Z) that are related to a second scaled factor (η) in accordance with a second relationship. The second relationship is defined such that the second scaled factor equals one of the following equations that results in a minimal error: (1) a sum of the third internal factor (G) plus the fourth internal factor (D) divided by a sum of a third approximation (γ) of a cosine of the constant pi divided by sixteen plus a fourth approximation (δ) of a sine of the constant pi divided by sixteen, (2) a sum of the third internal factor (G) plus the fifth internal factor (E) divided by a sum of the third approximation (γ) plus a fifth approximation (ε) of a cosine of three times the constant pi divided by 16, (3) a sum of the third internal factor (G) plus the sixth internal factor (Z) divided by a sum of the third approximation (γ) plus a sixth approximation (ζ) of a sine of three times the constant pi divided by 16, (4) a sum of the fourth internal factor (D) plus the fifth internal factor (E) divided by a sum of the fourth approximation (δ) plus the fifth approximation (ε), (5) a sum of the fourth internal factor (D) plus the sixth internal factor (Z) divided by a sum of the fourth approximation (δ) plus the sixth approximation (ζ), and (6) a sum of the fifth internal factor (E) plus the sixth internal factor (Z) divided by a sum of the fifth approximation (ε) plus the sixth approximation (ζ).

The details of one or more aspects of the techniques are set forth in the accompanying drawings and the description below. Other features, objects, and advantages of the techniques described in this disclosure will be apparent from the description and drawings, and from the claims.

DETAILED DESCRIPTION

Figure 1:
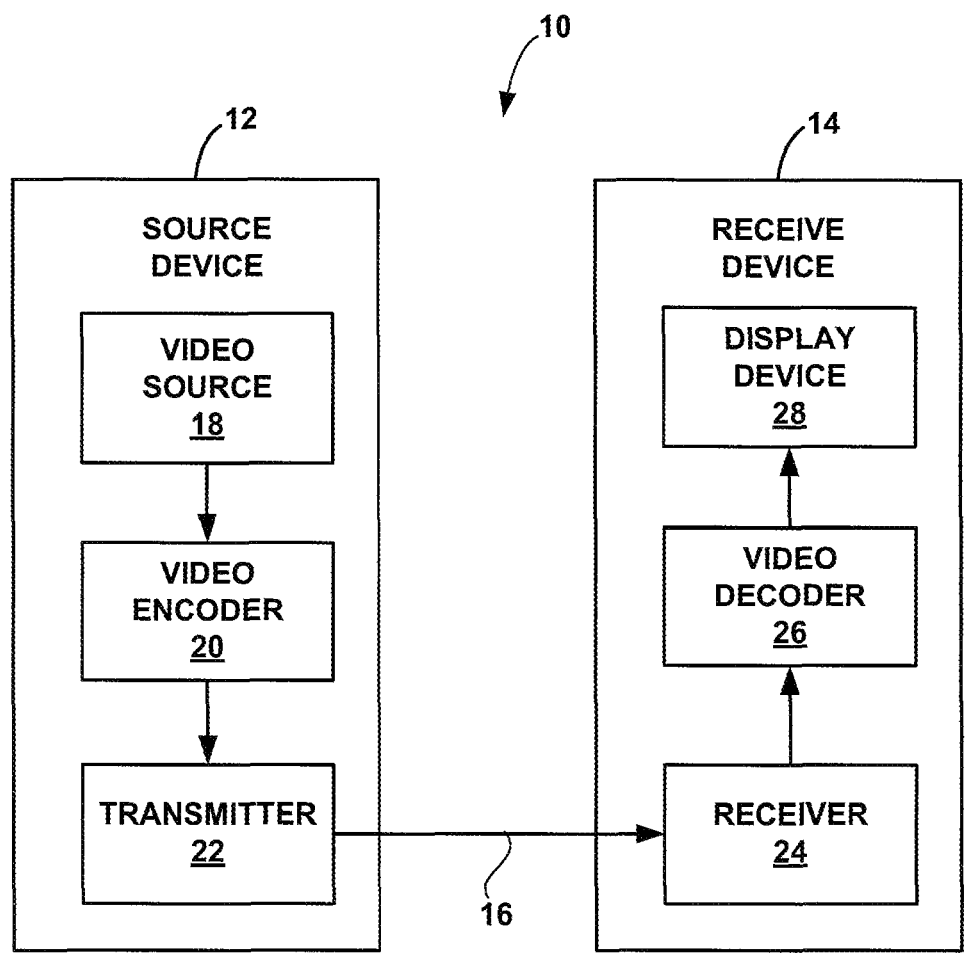
FIG. 1 is a block diagram illustrating a video encoding and decoding system.

In general, this disclosure is directed to techniques for coding data using one or more 8-point discrete cosine transforms (DCTs) represented as an 8×8 matrix of coefficients selected in accordance with various relationships. The techniques may be applied to compress a variety of data, including visible or audible media data, such as digital video, image, speech, and/or audio data, and thereby transform such electrical signals representing such data into compressed signals for more efficient processing, transmission or archival of the electrical signals. By adhering to the various relationships defined in accordance with the techniques of this disclosure, coefficients may be selected for the coefficient matrixes such that orthogonal and near-orthogonal implementations of 8-point DCTs, when applied to data, may promote increased coding gain.

The size denoted above, i.e., 8-point, is represented in terms of discrete data units. To illustrate, video data is often described in terms of video blocks, particularly with respect to video compression. A video block generally refers to any sized portion of a video frame, where a video frame refers to a picture or image in a series of pictures or images. Each video block typically comprises a plurality of discrete pixel data that indicates either color components, e.g., red, blue and green, (so-called "chromaticity" or "chroma" components) or luminance components (so-called "luma" components). Each set of pixel data comprises a single 1×1 point in the video block and may be considered a discrete data unit with respect to video blocks. Thus, an 8×8 video block, for example, comprises eight rows of pixel data with eight discrete sets of pixel data in each row. An n-bit value may be assigned to each pixel to specify a color or luminance value. When transforming an 8×8 video block, an 8-point DCT is applied to the rows to produce transformed rows. This is followed by applying the 8-point DCT to the columns of the transformed row data. The row-column ordering may also be reversed. Similarly for a rectangular block containing 8 rows and 4 columns, a 4-point DCT is applied across rows followed by an 8-point DCT across columns of the intermediate transformed row data.

DCTs are commonly described in terms of the size of data, whether audio, speech image or video data, the DCT is capable of processing. For example, if a DCT can process 8 samples of input data, the DCT may be referred to as an 8-point DCT. Moreover, DCTs may be denoted as a particular type. The most commonly employed type of DCT of the eight different types of DCTs is a DCT of type-II, which may be denoted as "DCT-II." Often, when referring generally to a DCT, such reference refers to a DCT of type-II or DCT-II. The inverse of a DCT-II is referred to as a DCT of type-III, which similarly may be denoted as "DCT-III" or, with the common understanding that DCT refers to a DCT-II, as "IDCT" where the "I" in "IDCT" denotes inverse. Reference to DCTs below conforms to this notation, where general reference to DCTs refers to a DCT-II unless otherwise specified. However, to avoid confusion, DCTs, including DCTs-II, are for the most part referred to below with the corresponding type (II, III, etc.) indicated.

The techniques described in this disclosure involve both an encoder and/or decoder that employ one or more implementations of the 8-point DCTs-II and/or 8-point DCTs-III, respectively, to facilitate compression and/or decompression of data. Again, the compression and decompression accomplished through applying these 8-point DCT-II implementations permits physical transformation of electrical signals representing the data such that the signals can be processed, transmitted, and/or stored more efficiently using physical computing hardware, physical transmission media (e.g., copper, optical fiber, wireless, or other media), and/or storage hardware (e.g., magnetic or optical disk or tape, or any of a variety of solid state media). The implementations may be configured solely in hardware or may be configured in a combination of hardware and software.

The implementations of the 8-point DCTs-II may be orthogonal or near-orthogonal. The term "orthogonal" refers to a property of the matrix in general where the matrix, when multiplied by the transpose of the matrix, equals the identity matrix. The term "near-orthogonal" refers to instances where this orthogonal property is relaxed, such that strict orthogonality is not required. In this respect, "near-orthogonal" suggests approximate or loose orthogonality. A near-orthogonal matrix, however, does not meet the technical definition of orthogonal and such near-orthogonal matrixes may be considered non-orthogonal from a purely technical perspective.

To illustrate the orthogonal implementation of the 8-point DCT-II described in this disclosure, consider an apparatus that includes an 8-point DCT module. The 8-point DCT module implements an orthogonal 8-point DCT-II constructed in accordance with the techniques described in this disclosure. This orthogonal 8-point DCT-II implementation includes an even portion and an odd portion. The so-called "even portion" of the 8-point DCT-II refers to a portion of the 8-point DCT-II implementation that outputs even numbered coefficients. The so-called "odd portion" of the 8-point DCT-II refers to a portion of the 8-point DCT-II implementation that outputs odd numbered coefficients.

In accordance with the techniques of this disclosure, the even portion comprises first and second internal factors (A, B) and a first scaled factor ($\mu$). The first scaled factor equals a square root of a sum of a square of the first internal factor plus a square of the second internal factor, as denoted in the following equation (1):

$$\mu = \sqrt{A^2 + B^2}. \tag{1}$$

The odd portion comprises third, forth, fifth and sixth internal factors (G, D, E, Z) and a second scaled factor ($\eta$). The second scaled factor equals a square root of a sum of a square of the third internal (G) factor plus a square of a fourth internal factor (D). The second scaled factor also equals a square root of a sum of a square of the fifth internal factor (E) plus a square of a sixth internal factor (Z). These two relationships between the second scaled factor and the third, fourth, fifth and sixth internal factors are defined mathematically by way of the following equation (2):

$$\eta = \sqrt{G^2 + D^2} = \sqrt{E^2 + Z^2}. \tag{2}$$

The term "internal factors" refers to factors internal to the implementation of the 8-point DCT that remain after factorization. The term "scaled factors" refers to factors external from the implementation of the 8-point DCT that are removed through factorization.

Internal factors commonly increase implementation complexity by requiring multiplications that may be expensive in terms of implementation complexity. For example, a multiplication may require three or more times as many computational operations to complete than a more simple addition operation. Specific multipliers may be implemented to perform multiplication more efficiently (e.g., in less clock cycles) but these multiplier implementations typically consume significantly more chip or silicon surface area and may also draw large amounts of power. Multiplication by factors is therefore often avoided, particularly in power sensitive devices, such as most mobile devices including cellular phones, so-called "smart" cellular phones, personal digital assistants (PDAs), laptop computers, so-called "netbooks," and the like. Factorization is a process whereby one or more internal factors may be removed from the 8-point DCT-II implementation and replaced with external factors. The external factors can then be incorporated in subsequent quantization operations, for example, with respect to video encoders, usually with minimal expense or increase in complexity.

In any event, the above relationships defined by equations (1) and (2) between the internal factors and the scaled factors noted above provide for specific values of the internal factors not used in previous implementations of 8-point DCTs-II. The video encoder then applies the 8-point DCT-II implementation (across rows and columns) with these internal factors to media data so as to transform the media data from a spatial domain to a frequency domain. By applying this orthogonal 8-point DCT-II implementation, the techniques facilitate coding gain (which is a term representative of compression efficiency) when compared to standard 8-point DCT-II implementations.

Orthogonality is generally desired with respect to DCT-II implementations because it is invertible. This invertible property, as one example, allows a video encoder to apply the orthogonal 8-point DCT-II implementation to generate DCT coefficients from residual blocks of video data. A video decoder can then apply an 8-point inverse DCT-II (IDCT) implementation to reconstruct the residual block of video data from the DCT-II coefficients with little if any loss in data. Considering that a main goal of video encoding is the preservation of data, various coding standards, such as H.264 video coding standard adopted an orthogonal implementation of the 8-point DCT.

While orthogonality is generally desired in theory, the video, audio or general coding pipeline in practice involves a number of steps that introduce so-called "noise" that in most respects effectively prevents the accurate reconstruction of the values provided by orthogonal 8-point DCT-II implementations. As a result, relaxing the orthogonal property to achieve a near-orthogonal (which is non-orthogonal technically speaking) may improve coding efficiency while reducing implementation complexity at the expense of a less precise approximation of the original DCT basis functions. In effect, relaxing the orthogonal property introduces noise into the system, but may improve coding gain while also reducing implementation complexity.

To illustrate an example of the near-orthogonal implementation of the 8-point DCT-II described in this disclosure, consider that the 8-point DCT module of the apparatus implements this near-orthogonal 8-point DCT-II that is constructed in accordance with the techniques described in this disclosure. This near-orthogonal 8-point DCT-II implementation includes an even portion comprising first and second internal factors (A, B) and a first scaled factor ($\mu$). The scaled factor equals a sum of the first internal factor plus the second internal factor divided by a sum of a first approximation ($\alpha$) of a cosine of three times a constant pie ($\pi$) divided by eight plus a second approximation ($\beta$) of a sine of three times the constant pie ($\pi$) divided by eight, as denoted mathematically in the following equation (3):

$$\mu = \frac{A+B}{\alpha+\beta}. \tag{3}$$

The near-orthogonal 8-point DCT-II implementation of this example also includes an odd portion comprising third, fourth, fifth and sixth internal factors (G, D, E, Z) and a second scaled factor ($\eta$). The second scaled factor equals one of the following terms that results in a minimal error, with this relationship defined by the following equation (4):

$$\eta \in \left\{ \frac{G+D}{\gamma+\delta}, \frac{G+E}{\gamma+\varepsilon}, \frac{G+Z}{\gamma+\varsigma}, \frac{D+E}{\delta+\varepsilon}, \frac{D+Z}{\delta+\varsigma}, \frac{E+Z}{\varepsilon+\varsigma} \right\}. \quad (4)$$

Equation (4) indicates that the second scaled factor may equal one of (1) a sum of the third internal factor (G) plus the fourth internal factor (D) divided by a sum of a third approximation (γ) of a cosine of the constant pie divided by sixteen plus a fourth approximation (δ) of a sine of the constant pie divided by sixteen, (2) a sum of the third internal factor (G) plus the fifth internal factor (E) divided by a sum of the third approximation (γ) plus a fifth approximation (ε) of a cosine of three times the constant pie divided by 16, (3) a sum of the third internal factor (G) plus the sixth internal factor (Z) divided by a sum of the third approximation (γ) plus a sixth approximation (ζ) of a sine of three times the constant pie divided by 16, (4) a sum of the fourth internal factor (D) plus the fifth internal factor (E) divided by a sum of the fourth approximation (δ) plus the fifth approximation (ε), (5) a sum of the fourth internal factor (D) plus the sixth internal factor (Z) divided by a sum of the fourth approximation (δ) plus the sixth approximation (ζ), and (6) a sum a sum of the fifth internal factor (E) plus the sixth internal factor (Z) divided by a sum of the fifth approximation (ε) plus the sixth approximation (ζ).

Again, these equations may identify particular internal factors values similar to those determined above with respect to the relationships defined with respect to the orthogonal implementation, but result in a different external factor. However, the different external factor does not typically increase implementation complexity for the reasons noted above, but does generally provide improved coding gain over conventional 8-point DCT-II implementations and even, in some instances, the orthogonal 8-point DCT-II implementation constructed in accordance with the techniques of this disclosure. Consequently, the control unit applies this near-orthogonal 8-point DCT-II to media data to transform the media data from a spatial domain to a frequency domain with the result of potentially improving coding gain.

FIG. 1 is a block diagram illustrating a video encoding and decoding system 10. As shown in FIG. 1, system 10 includes a source hardware device 12 that transmits encoded video to a receive hardware device 14 via a communication channel 16. Source device 12 may include a video source 18, video encoder 20 and a transmitter 22. Destination device 14 may include a receiver 24, video decoder 26 and video display device 28.

In the example of FIG. 1, communication channel 16 may comprise any wireless or wired communication medium, such as a radio frequency (RF) spectrum or one or more physical transmission lines, or any combination of wireless and wired media. Channel 16 may form part of a packet-based network, such as a local area network, wide-area network, or a global network such as the Internet. Communication channel 16 generally represents any suitable communication medium, or collection of different communication media, for transmitting video data from source device 12 to receive device 14.

Source device 12 generates video for transmission to destination device 14. In some cases, however, devices 12, 14 may operate in a substantially symmetrical manner. For example, each of devices 12, 14 may include video encoding and decoding components. Hence, system 10 may support one-way or two-way video transmission between video devices 12, 14, e.g., for video streaming, video broadcasting, or video telephony. For other data compression and coding applications, devices 12, 14 could be configured to send and receive, or exchange, other types of data, such as image, speech or audio data, or combinations of two or more of video, image, speech and audio data. Accordingly, the following discussion of video applications is provided for purposes of illustration and should not be considered limiting of the various aspects of the disclosure as broadly described herein.

Video source 18 may include a video capture device, such as one or more video cameras, a video archive containing previously captured video, or a live video feed from a video content provider. As a further alternative, video source 18 may generate computer graphics-based data as the source video, or a combination of live video and computer-generated video. In some cases, if video source 18 is a camera, source device 12 and receive device 14 may form so-called camera phones or video phones. Hence, in some aspects, source device 12, receive device 14 or both may form a wireless communication device handset, such as a mobile telephone. In each case, the captured, pre-captured or computer-generated video may be encoded by video encoder 20 for transmission from video source device 12 to video decoder 26 of video receive device 14 via transmitter 22, channel 16 and receiver 24. Display device 28 may include any of a variety of display devices such as a liquid crystal display (LCD), plasma display or organic light emitting diode (OLED) display.

Video encoder 20 and video decoder 26 may be configured to support scalable video coding for spatial, temporal and/or signal-to-noise ratio (SNR) scalability. In some aspects, video encoder 20 and video decoder 26 may be configured to support fine granularity SNR scalability (FGS) coding. Encoder 20 and decoder 26 may support various degrees of scalability by supporting encoding, transmission and decoding of a base layer and one or more scalable enhancement layers. For scalable video coding, a base layer carries video data with a minimum level of quality. One or more enhancement layers carry additional bitstream to support higher spatial, temporal and/or SNR levels.

Video encoder 20 and video decoder 26 may operate according to a video compression standard, such as MPEG-2, MPEG-4, ITU-T H.263, or ITU-T H.264/MPEG-4 Advanced Video Coding (AVC). Although not shown in FIG. 1, in some aspects, video encoder 20 and video decoder 26 may be integrated with an audio encoder and decoder, respectively, and include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

In some aspects, for video broadcasting, the techniques described in this disclosure may be applied to enhance H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," published as Technical Standard TIA-1099 (the "FLO Specification"), e.g., via a wireless video broadcast server or wireless communication device handset. The FLO Specification includes examples defining bitstream syntax and semantics and decoding processes suitable for the FLO Air Interface. Alternatively, video may be broadcasted according to other standards such as DVB-H (digital video broadcast-handheld), ISDB-T (integrated services digital broadcast-terrestrial), or DMB (digital media broadcast). Hence, source device 12 may be a mobile wireless terminal, a video streaming server, or a video broadcast server. However, techniques described in this disclosure are not limited to any particular type of broadcast, multicast, or point-to-point system. In the case of broadcast, source device 12 may broadcast several channels of video data to multiple receive device, each of which may be similar to receive device 14 of FIG. 1.

Video encoder 20 and video decoder 26 each may be implemented as one or more microprocessors, digital signal processors (DSPs), application specific integrated circuits (ASICs), field programmable gate arrays (FPGAs), discrete logic, software, hardware, firmware or any combinations thereof. Hence, each of video encoder 20 and video decoder 26 may be implemented at least partially as an integrated circuit (IC) chip or device, and included in one or more encoders or decoders, either of which may be integrated as part of a combined encoder/decoder (CODEC) in a respective mobile device, subscriber device, broadcast device, server, or the like. In addition, source device 12 and receive device 14 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are not shown in FIG. 1.

A video sequence includes a series of video frames. Video encoder 20 operates on blocks of pixels within individual video frames in order to encode the video data. The video blocks may have fixed or varying sizes, and may differ in size according to a specified coding standard. Each video frame includes a series of slices. Each slice may include a series of macroblocks, which may be arranged into sub-blocks. As an example, the ITU-T H.264 standard supports intra prediction in various dyadic block sizes, such as 16 by 16, 8 by 8, 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components.

Smaller video blocks can generally provide better resolution, and may be used for locations of a video frame that include higher levels of detail. In general, macroblocks (MBs) and the various sub-blocks may be considered, in general, to represent video blocks. In addition, a slice may be considered to represent a series of video blocks, such as MBs and/or sub-blocks. Each slice may be an independently decodable unit. After prediction, a transform may be performed on dyadic or non-dyadic sized residual blocks, and an additional transform may be applied to the DCT coefficients of the 4×4 blocks for chroma components or luma component if the intra_16×16 prediction mode is used.

Video encoder 20 and/or video decoder 26 of system 10 of FIG. 1 may be configured to include an implementation of an 8-point DCT-II and an inverse thereof (e.g., an 8-point DCT-III), respectively, wherein the 8-point DCT-II adheres to one of the various relationships of the techniques for selecting DCT-II matrix coefficients for an 8-point sized DCT described in this disclosure. While ITU-T H.264 standard supports intra prediction in various block sizes, such as 16 by 16, 8 by 8, 4 by 4 for luma components, and 8×8 for chroma components, revisions to this standard to improve coding efficiency are currently underway. One revised standard proposed by the Joint Collaborative Team-Video Coding (JCT-VC), which is a collaboration between MPEG and ITU-T, may be referred to as High Efficiency Video Coding (HEVC). Consequently, HEVC and other evolving standards or specifications may consider these DCTs-II and DCTs-III so as to improve coding efficiency.

In accordance with the techniques described in this disclosure, implementations of 8-point DCTs-II may be generated in a manner that adheres to one of the various relationships that may promote improved coding gain over conventional implementations. With respect to orthogonal implementations, the above equation (1), which is reiterated here for purposes of convenience, identifies a first relationship between even internal factors (or those of the factors internal to the even portion of the DCT-II implementation) and a first scaled factor applied to one or more of the outputs of the even portion:

$$\mu = \sqrt{A^2 + B^2}, \qquad (1)$$

where the variables A and B denote first and second internal factors in the "even" portion of the 8-point DCT-II implementation and the variable μ denotes a first scaled factor applied to the "even" portion of the 8-point DCT-II implementation. The so-called "even" portion of the 8-point DCT-II refers to a portion of the 4-point DCT-II implementation that outputs even numbered coefficients.

The so-called "odd portion" of the 8-point DCT-II refers to a portion of the 4-point DCT-II implementation that outputs odd numbered coefficients. In the orthogonal 8-point DCT-II implementation, the odd portion comprises third, forth, fifth and sixth internal factors (G, D, E, Z) and a second scaled factor (η). The second scaled factor equals a square root of a sum of a square of the third internal (G) factor plus a square of a fourth internal factor (D). The second scaled factor also equals a square root of a sum of a square of the fifth internal factor (E) plus a square of a sixth internal factor (Z). These two relationships between the second scaled factor and the third, fourth, fifth and sixth internal factors are defined mathematically as shown above with respect to equation (2), which again is reproduced here for purposes of convenience:

$$\eta = \sqrt{G^2 + D^2} = \sqrt{E^2 + Z^2}. \qquad (2)$$

The term "internal factors" refers to factors internal to the implementation of the 8-point DCT that remain after factorization. The term "scaled factors" refers to factors external from the implementation of the 8-point DCT that are removed through factorization.

Internal factors commonly increase implementation complexity by requiring multiplications that involve more complicated implementations. For example, a multiplication may require three or more times as many computational operations to complete than a more simple addition operation. Specific multipliers may be implemented to perform multiplication more efficiently (e.g., in less clock cycles) but these multiplier implementations typically consume significantly more chip or silicon surface area and may also draw large amounts of power. Multiplication by factors is therefore often avoided, particularly in power sensitive devices, such as most mobile devices including cellular phones, so-called "smart" cellular phones, personal digital assistants (PDAs), laptop computers, so-called "netbooks," and the like. Factorization is a process whereby one or more internal factors may be removed from the 8-point DCT-II implementation and replaced with external factors. The external factors can then be incorporated in subsequent quantization operations, for example, with respect to video encoders, usually with minimal expense or increase in complexity.

In any event, the above relationship between the first and second internal factors A, B and the first scaled factor (μ) noted above with respect to equation (1) and the relationship between the third through sixth internal factors G, D, E and Z and the second scaled factor (η) provides for specific values of the internal factors not generally used in previous implementations of 8-point DCTs-II. For example, values for internal factors A and B of 2 and 5, respectively, and G, D, E and Z of 11, 3, 9 and 7, respectively, do not overly increase implementation complexity and improve upon coding gain over known 8-point DCT implementations. The video encoder then applies the 8-point DCT-II implementation with these internal factors to media data so as to transform the media data from a spatial domain to a frequency domain. By applying this orthogonal 8-point DCT-II implementation, the techniques facilitate coding gain (which is a term representative of compression efficiency) when compared to conventional DCT-II implementations.

Orthogonality is generally desired with respect to DCT-II implementations because it is invertible. This invertible property, as one example, allows a video encoder to apply the orthogonal 8-point DCT implementation to generate DCT coefficients from residual blocks of video data. A video decoder can then apply an 8-point inverse DCT-II (IDCT) implementation to reconstruct the residual block of video data from the DCT-II coefficients with little if any loss in data. Considering that a main goal of video encoding is the preservation of data, various coding standards, such as the H.264 video coding standard, adopted an orthogonal implementation of the 8-point DCT.

While orthogonality is generally desired in theory, the video, audio or general coding pipeline in practice involves a number of steps that introduce so-called "noise" that in most respects effectively prevents the accurate reconstruction of the values provided by orthogonal 8-point DCT-II implementations. As a result, relaxing the orthogonal property to achieve a near-orthogonal (which is non-orthogonal technically speaking) may improve coding efficiency while reducing implementation complexity at the expense of a less precise approximation of the original DCT basis functions. In effect, relaxing the orthogonal property introduces noise into the system, but may improve coding gain while also reducing implementation complexity.

To illustrate an example of the near-orthogonal implementation of the 8-point DCT-II, consider an apparatus that includes a control unit, as one example. The control unit implements the near-orthogonal 8-point DCT-II in accordance with the techniques described in this disclosure. This near-orthogonal 8-point DCT-II implementation includes an even portion comprising first and second internal factors (A, B) and a first scaled factor ($\mu$), which is the same as the orthogonal implementation. The scaled factor equals a sum of the first internal factor plus the second internal factor divided by a sum of a first approximation ($\alpha$) of a cosine of three times a constant pie ($\pi$) divided by eight plus a second approximation ($\beta$) of a sine of three times the constant pie ($\pi$) divided by eight, as denoted mathematically by the above noted equation (3), which again is reproduced below for purposes of convenience:

$$\mu = \frac{A+B}{\alpha+\beta}. \qquad (3)$$

The near-orthogonal 8-point DCT-II implementation, in this example, also includes an odd portion an odd portion comprising third, fourth, fifth and sixth internal factors (G, D, E, Z) and a second scaled factor ($\eta$). The second scaled factor equals one of the following terms that results in a minimal error, with this relationship defined by the above noted equation (4), which is reproduced below for purposes of convenience:

$$\eta \in \left\{\frac{G+D}{\gamma+\delta}, \frac{G+E}{\gamma+\varepsilon}, \frac{G+Z}{\gamma+\varsigma}, \frac{D+E}{\delta+\varepsilon}, \frac{D+Z}{\delta+\varsigma}, \frac{E+Z}{\varepsilon+\varsigma}\right\}. \qquad (4)$$

Equation (4) indicates that the second scaled factor may equal one of (1) a sum of the third internal factor (G) plus the fourth internal factor (D) divided by a sum of a third approximation ($\gamma$) of a cosine of the constant pie divided by sixteen plus a fourth approximation ($\delta$) of a sine of the constant pie divided by sixteen, (2) a sum of the third internal factor (G) plus the fifth internal factor (E) divided by a sum of the third approximation ($\gamma$) plus a fifth approximation ($\varepsilon$) of a cosine of three times the constant pie divided by 16, (3) a sum of the third internal factor (G) plus the sixth internal factor (Z) divided by a sum of the third approximation ($\gamma$) plus a sixth approximation ($\varsigma$) of a sine of three times the constant pie divided by 16, (4) a sum of the fourth internal factor (D) plus the fifth internal factor (E) divided by a sum of the fourth approximation ($\delta$) plus the fifth approximation ($\varepsilon$), (5) a sum of the fourth internal factor (D) plus the sixth internal factor (Z) divided by a sum of the fourth approximation ($\delta$) plus the sixth approximation ($\varsigma$), and (6) a sum a sum of the fifth internal factor (E) plus the sixth internal factor (Z) divided by a sum of the fifth approximation ($\varepsilon$) plus the sixth approximation ($\varsigma$).

Again, these equations may identify particular internal factors values similar to those determined above with respect to the relationships defined with respect to the orthogonal implementation, but result in a different external factor. However, the different external factor does not typically increase implementation complexity for the reasons noted above, but does generally provide improved coding gain over conventional 8-point DCT-II implementations and even, in some instances, the orthogonal 8-point DCT-II implementation constructed in accordance with the techniques of this disclosure. Consequently, the control unit applies this near-orthogonal 8-point DCT-II to media data to transform the media data from a spatial domain to a frequency domain with the result of potentially improving coding gain.

Figure 2:
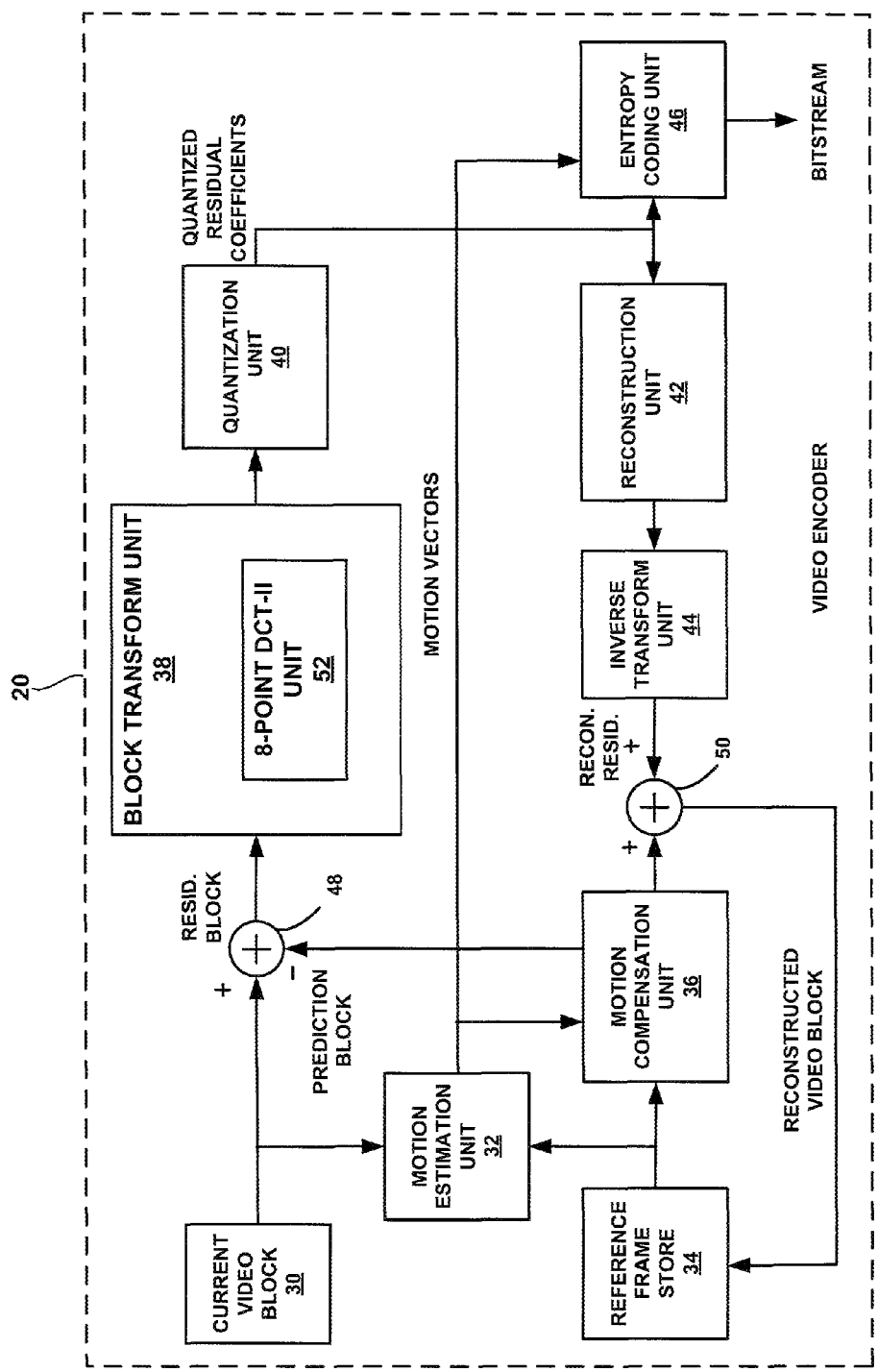
FIG. 2 is a block diagram illustrating the video encoder of FIG. 1 in more detail.

FIG. 2 is a block diagram illustrating video encoder 20 of FIG. 1 in more detail. Video encoder 20 may be formed at least in part as one or more integrated circuit devices, which may be referred to collectively as an integrated circuit device. In some aspects, video encoder 20 may form part of a wireless communication device handset or broadcast server. Video encoder 20 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames of a video sequence. For inter-coding, video encoder 20 performs motion estimation to track the movement of matching video blocks between adjacent frames.

As shown in FIG. 2, video encoder 20 receives a current video block 30 within a video frame to be encoded. In the example of FIG. 2, video encoder 20 includes motion estimation unit 32, reference frame store 34, motion compensation unit 36, block transform unit 38, quantization unit 40, inverse quantization unit 42, inverse transform unit 44 and entropy coding unit 46. An in-loop or post loop deblocking filter (not shown) may be applied to filter blocks to remove blocking artifacts. Video encoder 20 also includes summer 48 and summer 50. FIG. 2 illustrates the temporal prediction components of video encoder 20 for inter-coding of video blocks. Although not shown in FIG. 2 for ease of illustration, video encoder 20 also may include spatial prediction components for intra-coding of some video blocks.

Motion estimation unit 32 compares video block 30 to blocks in one or more adjacent video frames to generate one or more motion vectors. The adjacent frame or frames may be retrieved from reference frame store 34, which may comprise any type of memory or data storage device to store video blocks reconstructed from previously encoded blocks. Motion estimation may be performed for blocks of variable sizes, e.g., 16×16, 16×8, 8×16, 8×8 or smaller block sizes. Motion estimation unit 32 identifies one or more blocks in adjacent frames that most closely matches the current video block 30, e.g., based on a rate distortion model, and determines displacement between the blocks in adjacent frames and the current video block. On this basis, motion estimation unit 32 produces one or more motion vectors (MV) that indicate the magnitude and trajectory of the displacement between current video block 30 and one or more matching blocks from the reference frames used to code current video block 30. The matching block or blocks will serve as predictive (or prediction) blocks for inter-coding of the block to be coded.

Motion vectors may have half- or quarter-pixel precision, or even finer precision, allowing video encoder 20 to track motion with higher precision than integer pixel locations and obtain a better prediction block. When motion vectors with fractional pixel values are used, interpolation operations are carried out in motion compensation unit 36. Motion estimation unit 32 identifies the best block partitions and motion vector or motion vectors for a video block using certain criteria, such as a rate-distortion model. For example, there may be more than motion vector in the case of bi-directional prediction. Using the resulting block partitions and motion vectors, motion compensation unit 36 forms a prediction video block.

Video encoder 20 forms a residual video block by subtracting the prediction video block produced by motion compensation unit 36 from the original, current video block 30 at summer 48. Block transform unit 38 applies a transform producing residual transform block coefficients. As shown in FIG. 2, block transform unit 38 includes an 8-point DCT-II unit 52 that implements an 8-point DCT-II constructed in accordance with the techniques described in this disclosure. 8-point DCT-II unit 52 represents a hardware module, which in some instances executes software (such as a digital signal processor or DSP executing software code or instructions), that implements an 8-point DCT-II having internal factors defined by one of the two relationships identified above. Block transform unit 38 applies scaled 8-point DCT-II unit 52 to the residual block to produce an 8×8 block of residual transform coefficients. 8-point DCT-II unit 52 generally transforms the residual block from the spatial domain, which is represented as residual pixel data, to the frequency domain, which is represented as DCT coefficients. The transform coefficients may comprise DCT coefficients that include at least one DC coefficient and one or more AC coefficients.

Quantization unit 40 quantizes (e.g., rounds) the residual transform block coefficients to further reduce bit rate. As mentioned above, quantization unit 40 accounts for the scaled nature of scaled 8-point DCT-II unit 52 by incorporating internal factors removed during factorization. That is, quantization unit 40 incorporates the external factor shown below with respect to implementations 70 of FIG. 4. As quantization typically involves multiplication, incorporating these factors into quantization unit 40 may not increase the implementation complexity of quantization unit 40. In this respect, removing the factors from scaled 8-point DCT-II unit 52 decreases the implementation complexity of DCT-II unit 52 without increasing the implementation complexity of quantization unit 40, resulting in a net decrease of implementation complexity with respect to video encoder 20.

Entropy coding unit 46 entropy codes the quantized coefficients to even further reduce bit rate. Entropy coding unit 46 performs a statistical lossless coding, referred to in some instances, as entropy coding. Entropy coding unit 46 models a probability distribution of quantized DCT coefficients and selects a codebook (e.g., CAVLC or CABAC) based on the modeled probability distribution. Using this codebook, entropy coding unit 46 selects codes for each quantized DCT coefficient in a manner that compresses quantized DCT coefficients. To illustrate, entropy coding unit 46 may select a short codeword (in terms of bits) for frequently occurring quantized DCT coefficients and longer codeword (in term of bits) for less frequently occurring quantized DCT coefficients. So long as the short codeword uses less bits than the quantized DCT coefficients, on average entropy coding unit 46 compresses the quantized DCT coefficients. Entropy coding unit 46 outputs the entropy coded coefficients as a bitstream which is sent to video decoder 26. In general, video decoder 26 performs inverse operations to decode and reconstruct the encoded video from the bitstream, as will be described with reference to the example of FIG. 3.

Reconstruction unit 42 and inverse transform unit 44 reconstruct quantized coefficients and apply inverse transformation, respectively, to reconstruct the residual block. Inverse transform unit 44 may include an inverse DCT (IDCT), which is commonly referred to as a DCT of type III that performs the inverse operations of 8-point DCT-II unit 52, similar to 8-point DCT-III unit 68 described below with respect to FIG. 3. Summation unit 50 adds the reconstructed residual block to the motion compensated prediction block produced by motion compensation unit 36 to produce a reconstructed video block for storage in reference frame store 34. The reconstructed video block is used by motion estimation unit 32 and motion compensation unit 36 to encode a block in a subsequent video frame.

Figure 3:
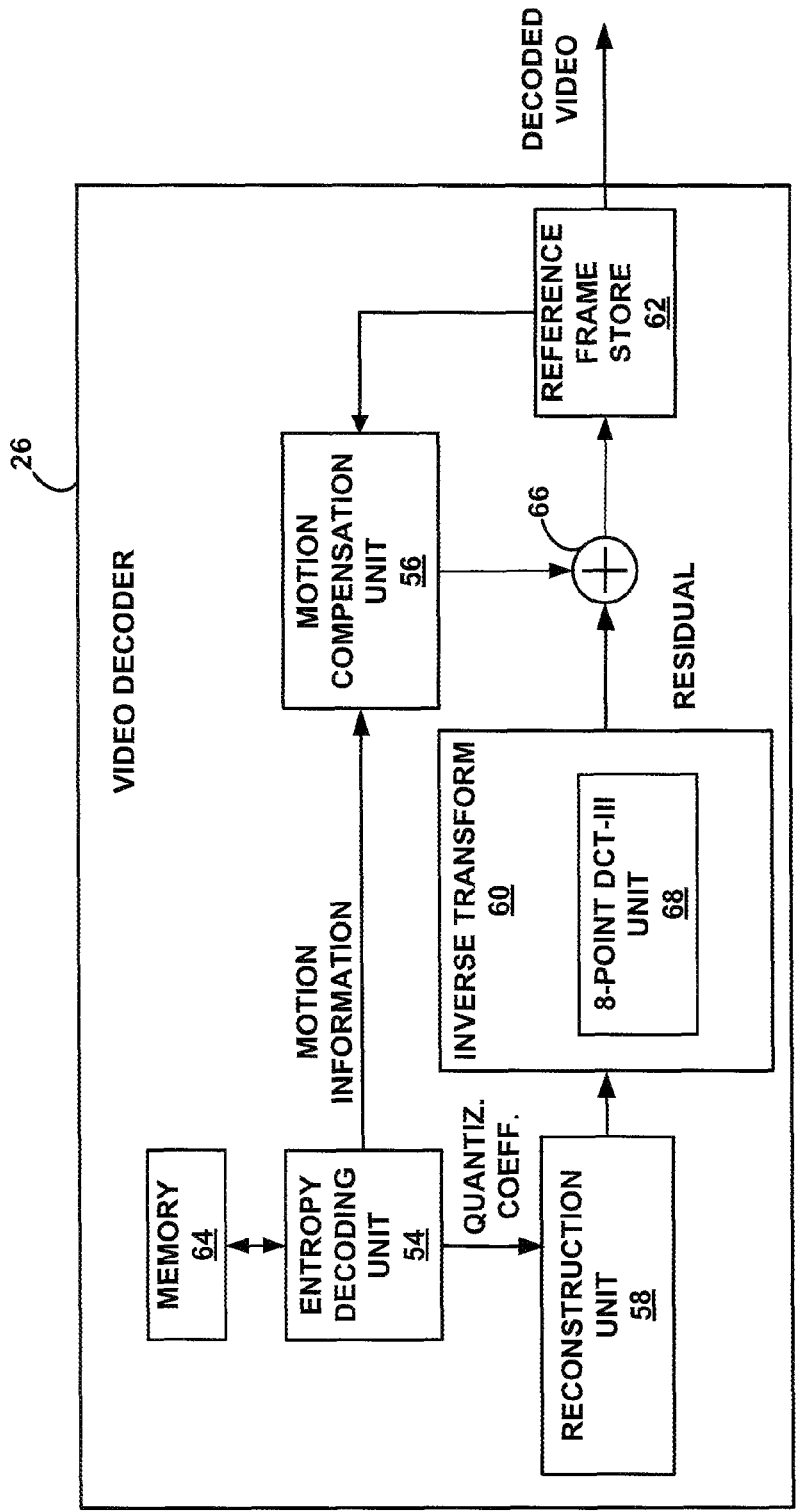
FIG. 3 is a block diagram illustrating the video decoder of FIG. 1 in more detail.

FIG. 3 is a block diagram illustrating an example of video decoder 26 of FIG. 1 in more detail. Video decoder 26 may be formed at least in part as one or more integrated circuit devices, which may be referred to collectively as an integrated circuit device. In some aspects, video decoder 26 may form part of a wireless communication device handset. Video decoder 26 may perform intra- and inter- decoding of blocks within video frames. As shown in FIG. 3, video decoder 26 receives an encoded video bitstream that has been encoded by video encoder 20. In the example of FIG. 3, video decoder 26 includes entropy decoding unit 54, motion compensation unit 56, reconstruction unit 58, inverse transform unit 60, and memory 62. Entropy decoding unit 54 may access one or more data structures stored in a memory 64 to obtain data useful in coding. Video decoder 26 also may include an in-loop or post loop deblocking filter (not shown) that filters the output of summer 66. Video decoder 26 also includes summer 66. FIG. 3 illustrates the temporal prediction components of video decoder 26 for inter-decoding of video blocks. Although not shown in FIG. 3, video decoder 26 also may include spatial prediction components for intra-decoding of some video blocks.

Entropy decoding unit 54 receives the encoded video bitstream and decodes from the bitstream quantized residual coefficients and quantized parameters, as well as other information, such as macroblock coding mode and motion information, which may include motion vectors and block partitions. Motion compensation unit 56 receives the motion vectors and block partitions and one or more reconstructed reference frames from reference frame store 62 to produce a prediction video block.

Reconstruction unit 58 inverse quantizes, i.e., de-quantizes, the quantized block coefficients. Inverse transform unit 60 applies an inverse transform, e.g., an inverse DCT, to the coefficients to produce residual blocks. More specifically, inverse transform unit 60 includes a scaled 8-point DCT-III unit 68, which inverse transform unit 60 applies to the coefficients to produce residual blocks. Scaled 8-point DCT-III unit 68, which is the inverse of scaled 8-point DCT-II unit 52 shown in FIG. 2, may transform the coefficients from the frequency domain to the spatial domain to produce the residual blocks. Similar to quantization unit 40 above, reconstruction unit 58 accounts for the scaled nature of 8-point DCT-III unit 68 by incorporating the external factors removed during factorization into the reconstruction process with little if any increase in implementation complexity. Removing factors from scaled 8-point DCT-III unit 68 may reduce implementation complexity, thereby resulting in a net decrease of complexity for video decoder 26.

The prediction video blocks are then summed by summer 66 with the residual blocks to form decoded blocks. A deblocking filter (not shown) may be applied to filter the decoded blocks to remove blocking artifacts. The filtered blocks are then placed in reference frame store 62, which provides reference frame for decoding of subsequent video frames and also produces decoded video to drive display device 28 (FIG. 1).

Figure 4:
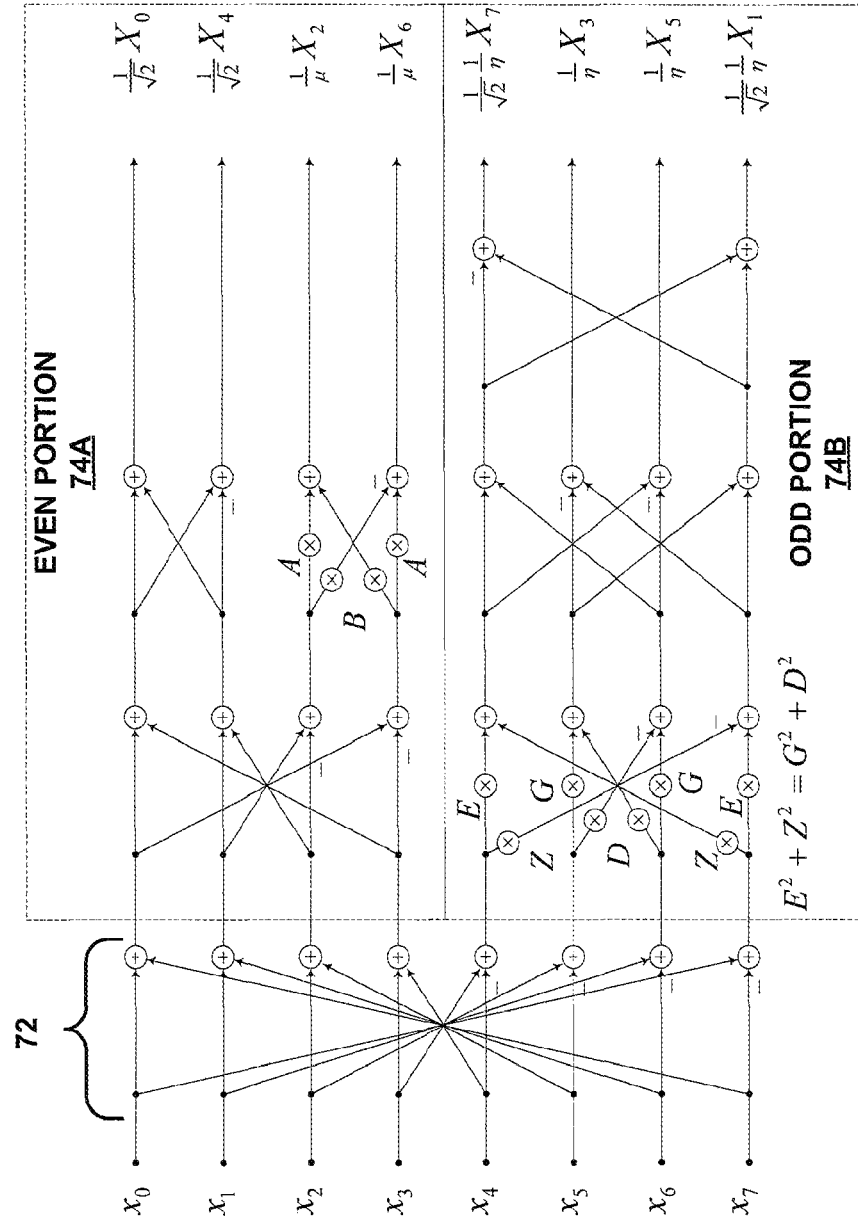
FIG. 4 is a diagram that illustrates implementations of a scaled 8-point DCT-II constructed in accordance with the techniques of this disclosure.

FIG. 4 is a diagram that illustrates a general implementation of a scaled 8-point DCT-II, such as that represented by 8-point DCT-II unit 52 shown in the example of FIG. 2, constructed in accordance with the techniques of this disclosure. In the example of FIG. 4, 8-point DCT-II implementation 70 represents both the orthogonal and near-orthogonal implementations of an 8-point DCT-II described above. In this sense, both the orthogonal and near-orthogonal implementation may be determined using the same factorization process, with the difference between the orthogonal and near-orthogonal implementations arises in the form of different internal and scaled factors, as noted below in more detail. While described with respect to this exemplary implementation, other implementations may be used that are derived through different factorization processes. The techniques of this disclosure, therefore, should not be limited to the example of FIG. 4. 8-point DCT-II unit 52 shown in the example of FIG. 2 may incorporate one or more these implementations 70. 8-point DCT-III unit 68 shown in the example of FIG. 3 may incorporate an inverse implementation of one or more of these implementations 70, where the inverse implementation merely reverses the signal path such that the inputs enter from the right and the outputs exit from the left of implementation 70.

As shown in the example of FIG. 4, 8-point DCT-II implementation 70A includes a butterfly unit 72, an even portion 74A and an odd portion 74B. Butterfly unit 72 may represent hardware or a combination of hardware and software for routing or otherwise forwarding inputs $x_0, \ldots, x_3$ to proper even and odd portions 74A, 47B ("portions 74"). Butterfly unit 72 usually combines the result of smaller DCTs, such as 4-point DCT-II implementations, which in this case may be represented by even and odd portions 74A, 74B respectively. Even portion 74A is a 4×4 portion of 8-point DCT-II implementation 70 that outputs even DCT coefficients $X_0, X_2, X_4$ and $X_6$. Notably, even coefficients $X_0$ and $X_4$ are multiplied by an external factor of one divided by the square root of two, which can be and usually is applied by quantization unit 40. Even coefficients $X_2$ and $X_6$ are multiplied by an external factor of one divided by mu ($\mu$), which again can be and usually is incorporated into and applied by quantization unit 40. Even portion 74A includes two external factors A and B, which are related to the mu ($\mu$) in one of two ways, as described in more detail below.

Odd portion 74B is a 4-point portion of 8-point DCT-II implementation 70 that outputs odd DCT coefficients $X_1, X_3, X_5$ and $X_7$. Odd portion 74B includes four internal factors denoted G, D, E and Z, which are related to an scaled factor eta ($\eta$) applied to odd DCT coefficients $X_1, X_3, X_5$ and $X_7$ in one of two ways, again as described below in more detail. Moreover, an external factor of one divided by the square root of two ($1/\sqrt{2}$) is applied to odd coefficients $X_1$ and $X_7$. Both the external factor of one divided by the square root of two and one over the scaled factor eta can be incorporated into quantization unit 40, which generally applies these factors without increasing the implementation complexity of video encoder 20.

For orthogonal implementations, the relationship noted in equations (1) and (2) can be derived by first considering the orthogonal property, which is set forth mathematically by the following equation (5):

$$C^T C = I. \tag{5}$$

The variable C in this instance refers to any matrix, while $C^T$ denotes the transpose of the matrix C. The variable I denotes an identity matrix. Thus, a matrix exhibits orthogonal property if the transpose of the matrix times the matrix itself equals the identity matrix.

Assuming a scaled matrix, which is preferred in media coding implementations for the reasons noted above, the matrix C can be split into an integer scaled transform denoted C' and a diagonal matrix of scale factors or external factors D, as noted in the following equation (6):

$$C = C'D. \tag{6}$$

Substituting C'D from equation (6) for C in equation (5) results in the following equation (7):

$$(C'D)^T (C'D) = D C'^T C'D = I, \tag{7}$$

which can be simplified to the mathematical equation shown in the following equation (8):

$$C'^T C' = D^{-2}. \tag{8}$$

Equation (8) provides a mechanism for choosing scaling factors such that the resulting integer transform remains orthogonal.

For example, in the case of 8-point DCT-II implementations, this DCT-II implementation usually only applies approximations of factors representative of the cosine of three times the constant pi divided by eight, the sine of three times the constant pi divided by eight, the costing of the constant pi divided by sixteen, the sine of the constant pi divided by sixteen, the cosine of three times the constant pi divided by sixteen and the sine of three times the constant pi divided by sixteen. Assuming that these six factors are to be replaced by integers A, B, G, D, E and Z, which are coefficients of the matrix C', and using the above orthogonality condition, equation (1) above denotes the normalization factor, such that the task of designing an orthogonal approximation of 8-point DCT-II may be limited to finding integers (A, B, G, D, E and Z), such that the following equations (9) and (10) are satisfied:

$$\mu = \sqrt{A^2 + B^2} \tag{9}$$

$$\eta = \sqrt{G^2 + D^2} = \sqrt{E^2 + Z^2} \tag{10}$$

The following Table 1 illustrates various values selected for the integers of A and B and the resulting approximation errors in comparison to an irrational DCT-II for even portion 74A of implementation 70 and the number of bits used.

TABLE 1

| Parameters | | | Approximation errors | | Bits used |
|---|---|---|---|---|---|
| A | B | $\mu$ | $\cos\left(\frac{3\pi}{8}\right) - A/\mu$ | $\sin\left(\frac{3\pi}{8}\right) - B/\mu$ | |
| 1 | 2 | $\sqrt{5}$ | −0.0645302 | 0.0294523 | 1 |
| 2 | 5 | $\sqrt{29}$ | 0.0112928 | −0.00459716 | 2 |
| 3 | 7 | $\sqrt{58}$ | −0.0112359 | 0.0047345 | 3 |
| 5 | 12 | $\sqrt{13}$ | −0.00193195 | 0.000802609 | 4 |
| 17 | 41 | $\sqrt{1970}$ | −0.00033159 | 0.000137419 | 5 |

The following Table 2 illustrates various values selected for the integers of G, D, E and Z and the resulting approximation errors in comparison to an irrational DCT-II for odd portion 74B of implementation 70 and the number of bits used.

TABLE 2

| Parameters | | | | | Approximation errors | | | | |
|---|---|---|---|---|---|---|---|---|---|
| G | D | E | Z | $\eta$ | $\gamma - \frac{G}{\eta}$ | $\delta - \frac{D}{\eta}$ | $\varepsilon - \frac{E}{\eta}$ | $\varsigma - \frac{Z}{\eta}$ | Bits used |
| 1 | 1 | 1 | 1 | 1.41421 | 0.273678 | −0.512016 | 0.124363 | −0.151537 | 1 |
| 3 | 1 | 3 | 1 | 3.16228 | 0.032102 | −0.121137 | −0.117214 | 0.239342 | 2 |
| 5 | 2 | 5 | 2 | 5.38516 | 0.052308 | −0.1763 | −0.097007 | 0.18418 | 3 |
| 11 | 3 | 9 | 7 | 11.4018 | 0.016021 | −0.068027 | 0.042117 | −0.058370 | 4 |
| 19 | 4 | 16 | 11 | 19.4165 | 0.002235 | −0.010920 | 0.007427 | −0.010958 | 5 |
| 38 | 8 | 32 | 22 | 38.833 | 0.002235 | −0.010920 | 0.007427 | −0.010958 | 6 |
| 65 | 13 | 55 | 37 | 66.2873 | 0.000204 | −0.001025 | 0.001747 | −0.002606 | 7 |
| 111 | 22 | 94 | 63 | 113.159 | −0.00013 | 0.0006739 | 0.000781 | −0.001167 | 8 |

Notably, the first three solution in both Tables 1 and 2 are somewhat inaccurate, but beginning with the fourth solution, where A and B are set to 5 and 12 and G, D, E and Z are set to 11, 3, 9 and 7 respectively, the complexity of the resulting implementation 70 increases but there is much less error in the approximations of the various cosine and sine terms. The fifth solution in the fifth row (after the header row) of Table 2 is approximately equal, in terms of approximation errors, to the solution of the sixth row of Table 2. The seventh and eighth solution listed in rows seven and eight of Table 2 exhibit very low approximation errors. From Tables 1 and 2, a number of different combinations for internal factors A, B, G, D, E and Z may be tried to fit implementation 70 for a particular use. Notable combination includes (A, B) values of (1, 2), (2, 5) or (3, 7) in combination with one of (G, D, E, Z) values of (11, 3, 9, 7) and (19, 4, 16, 11). In this respect, the techniques described in this disclosure promote increased coding gain with only minor increases in complexity, with implementation 70 incorporating one or more of the above combinations of values for internal factors A, B, G, D, E and Z to provide potentially improved coding gain with minimal increases to implementation complexity.

For near-orthogonal implementations, the relationship noted in equations (3) and (4) can be derived by first considering that, while orthogonality generally ensures a straight-forward inverse implementation of 8-point DCT-II in theory, in practice most scale factors (following integer transforms) become irrational numbers, which are hard to implement precisely using an integer multiplier. Moreover, quantization generally follows application of 8-point DCT transforms and this quantization adds noise which may prevent a straightforward application of the inverse orthogonal DCT-II implementation. Moreover, retaining orthogonality may actually cause approximations of such orthogonal implementations to be less precise with respect to original DCT-II basis functions. Consequently, relaxing the degree of such orthogonality mismatch between the straight and inverse implementations may actually improve coding gain.

To characterize the degree of mismatch, a norm of distance from the identity matrix is defined in accordance with the following equation (11):

$$\|C^T C - I\|. \qquad (11)$$

Using the same notation as that above with respect to equation (5), equation (11) simply indicates a norm of distance from the identity matrix can be defined as the transpose of the matrix time the matrix minus the identity matrix. Assuming that $C^T C$ remains diagonal, the average absolute distance can be computed in accordance with the following equation (12):

$$\delta_N = \frac{1}{N} tr(|C^T C - I|), \qquad (12)$$

where the average absolute distance is denoted by the variable $\delta_N$ and N equals the size of the matrix.

By relaxing the orthogonality property, coding gain may improve but analysis of coding gain with respect to the average absolute difference is too dependent on a particular model or statistics of image undergoing compression. Consequently, the extent to which to relax the orthogonality property may be determined through analysis of a different metric related to finding integer transforms that are potentially best in terms of matching basis functions of DCT-II. More information regarding this form of evaluation can be found in an article authored by Y. A. Reznik, A. T. Hinds, and J. L. Mitchell, entitled "Improved Precision of Fixed-Point Algorithms by Means of Common Factors," Proc. ICIP 2008, San Diego, Calif., the entire contents of which are incorporated by reference as if fully set forth herein.

From this incorporated reference, one technique for producing best matching design is referred to as a "common-factor-based approximation." Using this techniques, equations (3) and (4) can be derived, both of which are reproduced below for purposes of convenience:

$$\mu = \frac{A + B}{\alpha + \beta}. \qquad (3)$$

-continued $$\eta \in \left\{ \frac{G+D}{\gamma+\delta}, \frac{G+E}{\gamma+\varepsilon}, \frac{G+Z}{\gamma+\varsigma}, \frac{D+E}{\delta+\varepsilon}, \frac{D+Z}{\delta+\varsigma}, \frac{E+Z}{\varepsilon+\varsigma} \right\}. \quad (4)$$

The following Table 3 illustrates various values selected for the integers of A and B and the resulting approximation errors.

TABLE 3

| Parameters | | | Approximation errors | | | |
|---|---|---|---|---|---|---|
| A | B | $\mu$ | $\cos\left(\frac{3\pi}{8}\right) - A/\mu$ | $\sin\left(\frac{3\pi}{8}\right) - B/\mu$ | $\frac{A^2 + B^2}{\mu^2} - 1$ | Bit-depth expansion due to factors C, S |
| 1 | 2 | 2.296100594 | −0.0528375558 | 0.0528375558 | −0.0516073433 | 1-bit |
| 2 | 5 | 5.357568053 | 0.0093797282 | −0.0093797282 | 0.010328504 | 2-bits |
| 5 | 12 | 13.01123670 | −0.0015997926 | 0.0015997926 | −0.0017264839 | 4-bits |

The following Table 4 illustrates various values selected for the integers of G, D, E and Z and the resulting approximation errors in comparison to an irrational DCT-II.

TABLE 4

| Parameters | | | | | Approximation errors | | | | |
|---|---|---|---|---|---|---|---|---|---|
| G | D | E | Z | $\eta$ | $\gamma - \frac{G}{\eta}$ | $\delta - \frac{D}{\eta}$ | $\varepsilon - \frac{E}{\eta}$ | $\varsigma - \frac{Z}{\eta}$ | Bits used |
| 1 | 1 | 1 | 1 | 1.70086 | 0.392847 | −0.392847 | 0.243532 | −0.0323676 | 1 |
| 3 | 1 | 2 | 2 | 2.92238 | −0.045774 | −0.147096 | 0.147096 | −0.128803 | 2 |
| 5 | 1 | 4 | 3 | 5.04672 | −0.009957 | −0.0030582 | 0.0388754 | −0.0388754 | 3 |
| 11 | 2 | 9 | 6 | 11.036 | −0.015954 | 0.0138648 | 0.0159549 | 0.0118938 | 4 |
| 21 | 4 | 18 | 12 | 21.4308 | 0.0008871 | 0.00844306 | −0.0084430 | −0.0043715 | 5 |
| 25 | 5 | 21 | 14 | 25.3827 | −0.004135 | −0.0018939 | 0.00413586 | 0.0040144 | 6 |
| 60 | 12 | 51 | 34 | 61.2497 | 0.0011880 | −0.0008291 | −0.0011880 | 0.00046513 | 7 |
| 171 | 34 | 145 | 97 | 174.439 | 0.0004987 | 0.00017954 | 0.00023248 | −0.0004987 | 8 |
| 256 | 51 | 217 | 145 | 261.066 | 0.0001907 | −0.0002625 | 0.00026250 | 0.00015534 | 9 |

In Table 4, pairs of errors that become symmetrized by using the common factor approach are underlined. These symmetric errors represent worst case approximation errors found for the set of four internal factors in the odd portion of the transform.

The following Table 5 illustrates a comparison of worst case precision of an orthogonal implementation 70 and a near- or non-orthogonal implementation 70 based on the number of bits used.

TABLE 5

| | Worst-case error | |
|---|---|---|
| Bits used | orthogonal transform | Non-orthogonal transform |
| 1 | 0.512016 | 0.3928470 |
| 2 | 0.239342 | 0.1470960 |
| 3 | 0.184180 | 0.0388754 |
| 4 | 0.068027 | 0.0159549 |
| 5 | 0.010958 | 0.0084430 |
| 6 | 0.010958 | 0.0041358 |
| 7 | 0.001747 | 0.0011880 |
| 8 | 0.001167 | 0.0004987 |

As seen in Table 5, all of the non-orthogonal implementations of the DCT-II have a lower worst case error than the corresponding orthogonal implementations, especially the three-bit non-orthogonal implementation when compared to the three-bit orthogonal implementation. This three-bit non-orthogonal implementation may, in addition to providing increased coding gain through better approximation of the irrational DCT-II factors, also require less complex mathematical operations than even the 8-point DCT-II specified in the H.264 video coding standard.

While described above as a linear or 1-dimensional DCT, the 8-point DCT implementation described in this disclosure may be represented as an 8×8 DCT-II matrix as shown in the following Table 6. Depending on the choice of parameters A, B, G, D, E, and Z, a number of matrix coefficients may become large, resulting in increased implementation complexity in terms of operations required to perform multiplications by these large values. To remove these large values and balance dynamic range across the transform, right shifts may be introduced into the implementation after multiplications. In some instances, the right shifts may shift values to the right by an arbitrary positive integer with one example restriction being that the right shifts for parameters A and B are the same. Similarly shifts to the right for G, D, E, and Z may also need to be the same. The right shifts convert these integer parameters into dyadic rationals, which is a rational number with a denominator as a power of two. Typically, the right shifts decrease the accuracy of the transform and, as a result, it is often desirable to keep these right shifts to a minimum. Also the input samples may be pre-shifted to the left by a constant to minimize the loss of accuracy due to right-shifting. A typical example is right shifts by one for A and B and right shifts by 4 for G, D, E, and Z.

TABLE 6

| 8 × 8 DCT-II Matrix | | | | | | | |
|---|---|---|---|---|---|---|---|
| 1 | 1 | 1 | 1 | 1 | 1 | 1 | 1 |
| E + Z | D + G | G − D | −Z + E | Z − E | −G + D | −D − G | −E − Z |
| B | A | −A | −B | −B | −A | A | B |
| E | −D | −G | −Z | Z | G | D | −E |
| 1 | −1 | −1 | 1 | 1 | −1 | −1 | 1 |
| Z | −G | D | E | −E | −D | G | −Z |

TABLE 6-continued

8 × 8 DCT-II Matrix

| A | −B | B | −A | −A | B | −B | A |
|---|---|---|---|---|---|---|---|
| −Z + E | −G + D | D + G | −E − Z | E + Z | −D − G | G − D | Z − E |

While described in the example of FIG. 4 with respect to a DCT-II unit, this DCT-II unit may also represent an IDCT constructed in accordance with the techniques of this disclosure. Forming an inverse DCT from the implementation shown in the example of FIG. 4 involves reversing the inputs and the outputs such that inputs are received by the implementation on the right of FIG. 4 and outputs are output at the left of the implementation. In other words, inverting the implementation about the vertical access such that the inputs then become the outputs and the outputs become the inputs would generally produce the IDCT implementation. For ease of illustration purposes and considering that forming an IDCT from a DCT is well known in the art, these additional IDCT implementations are not shown in separate FIGS.

Figure 5:
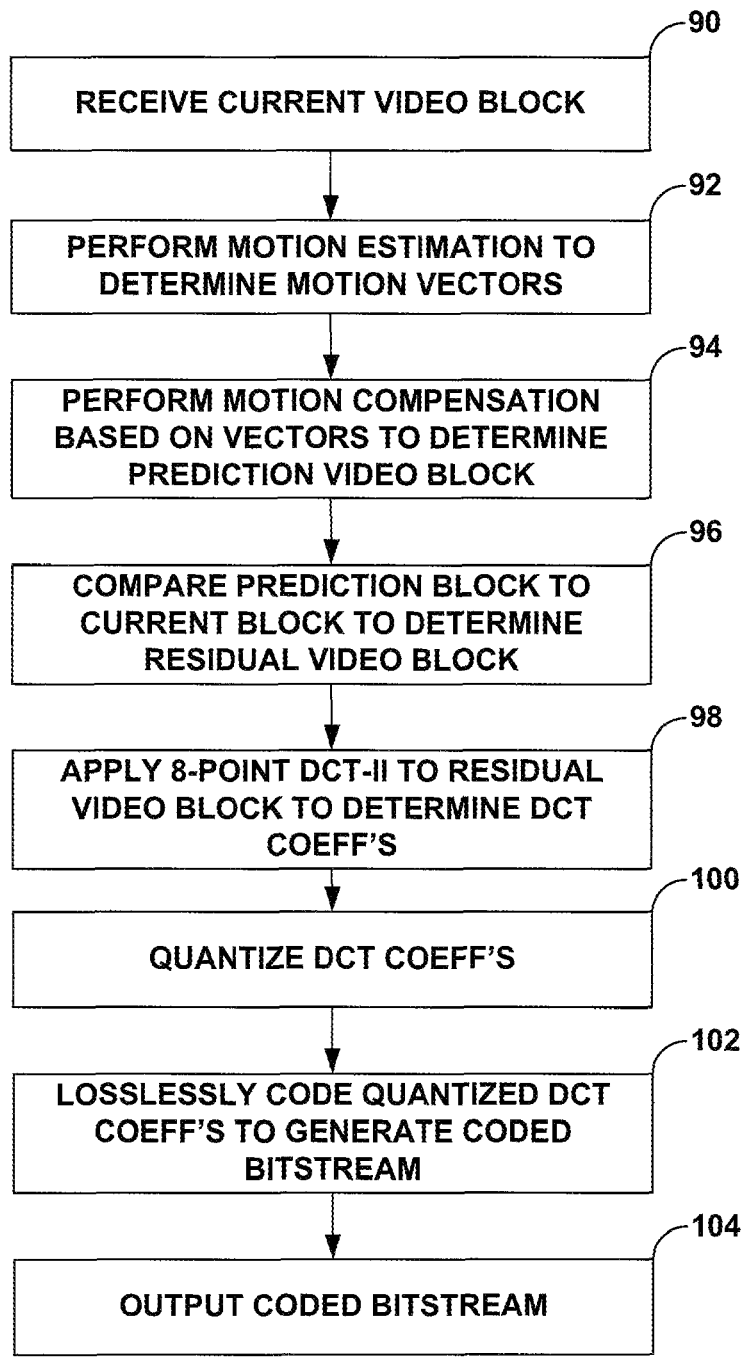
FIG. 5 is a flow chart illustrating exemplary operation of a coding device in applying an 8-point DCT implementation constructed in accordance with the techniques of this disclosure.

FIG. 5 is a flow chart illustrating exemplary operation of a coding device, such as video encoder 20 of FIG. 2, in applying an 8-point DCT implementation constructed in accordance with the techniques of this disclosure. Initially, video encoder 20 receives a current video block 30 within a video frame to be encoded (90). Motion estimation unit 32 performs motion estimation to compare video block 30 to blocks in one or more adjacent video frames to generate one or more motion vectors (92). The adjacent frame or frames may be retrieved from reference frame store 34. Motion estimation may be performed for blocks of variable sizes, e.g., 16×16, 16×8, 8×16, 8×8, 4×4 or smaller block sizes. Motion estimation unit 32 identifies one or more blocks in adjacent frames that most closely matches the current video block 30, e.g., based on a rate distortion model, and determines displacement between the blocks in adjacent frames and the current video block. On this basis, motion estimation unit 32 produces one or more motion vectors (MV) that indicate the magnitude and trajectory of the displacement between current video block 30 and one or more matching blocks from the reference frames used to code current video block 30. The matching block or blocks will serve as predictive (or prediction) blocks for inter-coding of the block to be coded.

Motion vectors may have half- or quarter-pixel precision, or even finer precision, allowing video encoder 20 to track motion with higher precision than integer pixel locations and obtain a better prediction block. When motion vectors with fractional pixel values are used, interpolation operations are carried out in motion compensation unit 36. Motion estimation unit 32 identifies the best block partitions and motion vector or motion vectors for a video block using certain criteria, such as a rate-distortion model. For example, there may be more than motion vector in the case of bi-directional prediction. Using the resulting block partitions and motion vectors, motion compensation unit 36 forms a prediction video block (94).

Video encoder 20 forms a residual video block by subtracting the prediction video block produced by motion compensation unit 36 from the original, current video block 30 at summer 48 (96). Block transform unit 38 applies a transform producing residual transform block coefficients. Block transform unit 38 includes an 8-point DCT-II unit 52 generated in accordance with the techniques described in this disclosure. Block transform unit 38 applies scaled 8-point DCT-II unit 52 to the residual block to produce an 8×8 block of residual transform coefficients. 8-point DCT-II unit 52 generally transforms the residual block from the spatial domain, which is represented as residual pixel data, to the frequency domain, which is represented as DCT coefficients. In this way, 8-point DCT-II unit 52 applies the implementation for the 8-point DCT-II described above to residual data to determine DCT coefficients (98). The transform coefficients may comprise DCT coefficients that include at least one DC coefficient and one or more AC coefficients.

Quantization unit 40 quantizes (e.g., rounds) the residual transform block coefficients to further reduce bit rate (100). As mentioned above, quantization unit 40 accounts for the scaled nature of scaled 8-point DCT-II unit 52 by incorporating internal factors removed during factorization. That is, quantization unit 40 incorporates the external factor noted above with respect to implementation 70 of FIG. 4. As quantization typically involves multiplication, incorporating these factors into quantization unit 40 may not increase the implementation complexity of quantization unit 40. In this respect, removing the factors from scaled 8-point DCT-II unit 52 decreases the implementation complexity of DCT-II unit 52 without increasing the implementation complexity of quantization unit 40, resulting in a net decrease of implementation complexity with respect to video encoder 20.

Entropy coding unit 46 entropy codes the quantized coefficients to even further reduce bit rate. Entropy coding unit 46 performs a statistical lossless coding, referred to in some instances, as entropy coding to generate a coded bitstream (102). Entropy coding unit 46 models a probability distribution of quantized DCT coefficients and selects a codebook (e.g., CAVLC or CABAC) based on the modeled probability distribution. Using this codebook, entropy coding unit 46 selects codes for each quantized DCT coefficient in a manner that compresses quantized DCT coefficients. Entropy coding unit 46 outputs the entropy coded coefficients as a coded bitstream which is stored to a memory or storage device and/or sent to video decoder 26 (104).

Reconstruction unit 42 and inverse transform unit 44 reconstruct quantized coefficients and apply inverse transformation, respectively, to reconstruct the residual block. Again, inverse transform unit 44 may include an inverse DCT (IDCT), which is commonly referred to as a DCT of type III that performs the inverse operations of 8-point DCT-II unit 52, similar to 8-point DCT-III unit 68 described below with respect to FIG. 3. Summation unit 50 adds the reconstructed residual block to the motion compensated prediction block produced by motion compensation unit 36 to produce a reconstructed video block for storage in reference frame store 34. The reconstructed video block is used by motion estimation unit 32 and motion compensation unit 36 to encode a block in a subsequent video frame.

Figure 6:
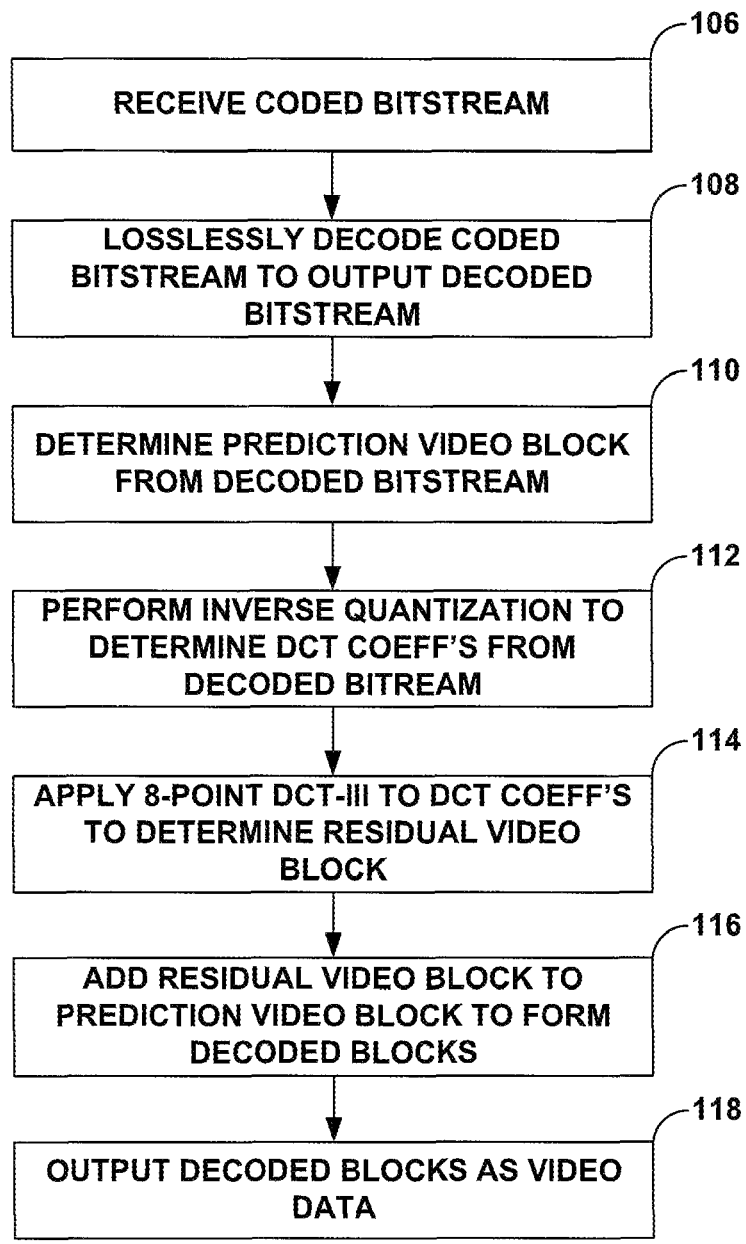
FIG. 6 is a flowchart illustrating example operation of a coding device in applying an 8-point DCT-III implementation constructed in accordance with the techniques of this disclosure.

FIG. 6 is a flowchart illustrating example operation of a coding device, such as video decoder 26 of FIG. 3, in applying an 8-point DCT-III implementation constructed in accordance with the techniques of this disclosure. Video decoder 26 receives an encoded video bitstream that has been encoded by video encoder 20. In particular, entropy decoding unit 54 receives the encoded video bitstream and decodes from the bitstream quantized residual coefficients and quantized parameters, as well as other information, such as macroblock coding mode and motion information, which may include motion vectors and block partitions (106, 108). Motion compensation unit 56 receives the motion vectors and block partitions and one or more reconstructed reference frames from reference frame store 62 to produce a prediction video block (110).

Reconstruction unit 58 inverse quantizes, i.e., de-quantizes, the quantized block coefficients (112). Inverse transform unit 60 applies an inverse transform, e.g., an inverse DCT, to the coefficients to produce residual blocks. More specifically, inverse transform unit 60 includes a scaled 8-point DCT-III unit 68, which inverse transform unit 60 applies to the coefficients to produce residual blocks (114). Scaled 8-point DCT-III unit 68, which is the inverse of scaled 8-point DCT-II unit 52 shown in FIG. 2, may transform the coefficients from the frequency domain to the spatial domain to produce the residual blocks. Similar to quantization unit 40 above, reconstruction unit 58 accounts for the scaled nature of 8-point DCT-III unit 68 by incorporating the external factors removed during factorization into the reconstruction process with little if any increase in implementation complexity. Removing factors from scaled 8-point DCT-III unit 68 may reduce implementation complexity, thereby resulting in a net decrease of complexity for video decoder 26.

The prediction video blocks are then summed by summer 66 with the residual blocks to form decoded blocks (116). A deblocking filter (not shown) may be applied to filter the decoded blocks to remove blocking artifacts. The filtered blocks are then placed in reference frame store 62, which provides reference frame for decoding of subsequent video frames and also produces decoded video to drive a display device, such as display device 28 of FIG. 1 (118).

The techniques of this disclosure may be implemented in a wide variety of devices or apparatuses, including a wireless communication device handset such as a mobile phone, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware, software, firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a computer-readable storage medium that is a physical non-transitory structure, and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec.

Also, the techniques could be fully implemented in one or more circuits or logic elements.

The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various aspects of the techniques have been described. These and other aspects are within the scope of the following claims.

The invention claimed is:

1. A method comprising:
   receiving coded media data with a coding device, wherein the coded media data comprises one or more of coded image data and coded video data;
   applying first and second scaled factors ($\mu,\eta$) with an inverse quantization unit to one or more quantized DCT coefficients of the coded media data to determine one or more DCT coefficients; and
   performing a 8-point inverse discrete cosine transform (IDCT) with an 8-point IDCT hardware unit of the coding device to transform the determined one or more DCT coefficients of the coded media data from a frequency domain to a spatial domain so as to determine residual media data, wherein the 8-point IDCT hardware unit includes:
   an even portion comprising first and second internal factors (A, B) that are related to the first scaled factor ($\mu$) in accordance with a first relationship, wherein the first relationship is defined such that the first scaled factor equals a square root of a sum of a square of the first internal factor plus a square of the second internal factor; and
   an odd portion comprising third, fourth, fifth and sixth internal factors (G, D, E, Z) that are related to the second scaled factor ($\eta$) in accordance with a second relationship,
   wherein the second relationship is defined such that the second scaled factor equals a square root of a sum of a square of the third internal factor plus a square of the fourth internal factor, and
   wherein the second relationship also is defined such that the second scaled factor equals a square root of a sum of a square of the fifth internal factor plus a square of the sixth internal factor.

2. The method of claim 1,
   wherein the first internal factor A is set to one,
   wherein the second internal factor B is set to two,
   wherein the third internal factor G is set to eleven,
   wherein the fourth internal factor D is set to three,
   wherein the fifth internal factor E is set to nine, and
   wherein the sixth internal factor Z is set to seven.

3. The method of claim 1,
   wherein the first internal factor A is set to one,
   wherein the second internal factor B is set to two,
   wherein the third internal factor G is set to nineteen,
   wherein the fourth internal factor D is set to four,
   wherein the fifth internal factor E is set to sixteen, and
   wherein the sixth internal factor Z is set to eleven.

4. The method of claim 1,
   wherein the first internal factor A is set to two,
   wherein the second internal factor B is set to five,
   wherein the third internal factor G is set to eleven, wherein the fourth internal factor D is set to three,
wherein the fifth internal factor E is set to nine, and
wherein the sixth internal factor Z is set to seven.

5. The method of claim 1,
wherein the first internal factor A is set to two,
wherein the second internal factor B is set to five,
wherein the third internal factor G is set to nineteen,
wherein the fourth internal factor D is set to four,
wherein the fifth internal factor E is set to sixteen, and
wherein the sixth internal factor Z is set to eleven.

6. The method of claim 1,
wherein the first internal factor A is set to three,
wherein the second internal factor B is set to seven,
wherein the third internal factor G is set to eleven,
wherein the fourth internal factor D is set to three,
wherein the fifth internal factor E is set to nine, and
wherein the sixth internal factor Z is set to seven.

7. The method of claim 1,
wherein the first internal factor A is set to three,
wherein the second internal factor B is set to seven,
wherein the third internal factor G is set to nineteen,
wherein the fourth internal factor D is set to four,
wherein the fifth internal factor E is set to sixteen, and
wherein the sixth internal factor Z is set to eleven.

8. The method of claim 1, wherein the 8-point IDCT hardware unit comprises a processor that executes software to implement the 8-point IDCT.

9. The method of claim 1,
wherein the internal factors A, B, G, D, E and Z are normalized such that these internal factors become dyadic rational values,
wherein a first denominator used to normalize the internal factors A and B is a first power of two, and
wherein a second denominator used to normalize the interface factors G, D, E and Z is a second power of two.

10. An apparatus comprising:
an inverse quantization unit that applies first and second scaled factors ($\mu$, $\eta$) with to one or more quantized DCT coefficients of coded media data to determine one or more DCT coefficients, wherein the coded media data comprises one or more of coded image data and coded video data; and
an 8-point inverse discrete cosine transform (IDCT) hardware unit that transforms the determined one or more DCT coefficients of the coded media data from a frequency domain to a spatial domain so as to determine residual media data, wherein the 8-point IDCT hardware unit includes:
an even portion comprising first and second internal factors (A, B) that are related to the first scaled factor ($\mu$) in accordance with a first relationship, wherein the first relationship is defined such that the first scaled factor equals a square root of a sum of a square of the first internal factor plus a square of the second internal factor; and
an odd portion comprising third, fourth, fifth and sixth internal factors (G, D, E, Z) that are related to the second scaled factor ($\eta$) in accordance with a second relationship,
wherein the second relationship is defined such that the second scaled factor equals a square root of a sum of a square of the third internal factor plus a square of the fourth internal factor, and
wherein the second relationship also is defined such that the second scaled factor equals a square root of a sum of a square of the fifth internal factor plus a square of the sixth internal factor.

11. The apparatus of claim 10,
wherein the first internal factor A is set to one,
wherein the second internal factor B is set to two,
wherein the third internal factor G is set to eleven,
wherein the fourth internal factor D is set to three,
wherein the fifth internal factor E is set to nine, and
wherein the sixth internal factor Z is set to seven.

12. The apparatus of claim 10,
wherein the first internal factor A is set to one,
wherein the second internal factor B is set to two,
wherein the third internal factor G is set to nineteen,
wherein the fourth internal factor D is set to four,
wherein the fifth internal factor E is set to sixteen, and
wherein the sixth internal factor Z is set to eleven.

13. The apparatus of claim 10,
wherein the first internal factor A is set to two,
wherein the second internal factor B is set to five,
wherein the third internal factor G is set to eleven,
wherein the fourth internal factor D is set to three,
wherein the fifth internal factor E is set to nine, and
wherein the sixth internal factor Z is set to seven.

14. The apparatus of claim 10,
wherein the first internal factor A is set to two,
wherein the second internal factor B is set to five,
wherein the third internal factor G is set to nineteen,
wherein the fourth internal factor D is set to four,
wherein the fifth internal factor E is set to sixteen, and
wherein the sixth internal factor Z is set to eleven.

15. The apparatus of claim 10,
wherein the first internal factor A is set to three,
wherein the second internal factor B is set to seven,
wherein the third internal factor G is set to eleven,
wherein the fourth internal factor D is set to three,
wherein the fifth internal factor E is set to nine, and
wherein the sixth internal factor Z is set to seven.

16. The apparatus of claim 10,
wherein the first internal factor A is set to three,
wherein the second internal factor B is set to seven,
wherein the third internal factor G is set to nineteen,
wherein the fourth internal factor D is set to four,
wherein the fifth internal factor E is set to sixteen, and
wherein the sixth internal factor Z is set to eleven.

17. The apparatus of claim 10, wherein the 8-point IDCT hardware unit comprises a processor that executes software to implement the orthogonal 8-point IDCT.

18. The apparatus of claim 10,
wherein the internal factors A, B, G, D, E and Z are normalized such that these internal factors become dyadic rational values,
wherein a first denominator used to normalize the internal factors A and B is a first power of two, and
wherein a second denominator used to normalize the interface factors G, D, E and Z is a second power of two.

19. A device comprising:
means for receiving coded media data, wherein the coded media data comprises one or more of coded image data and coded video data;
means for applying first and second scaled factors ($\mu$, $\eta$) with an inverse quantization unit to one or more quantized DCT coefficients of the coded media data to determine one or more DCT coefficients; and
means for performing a 8-point inverse discrete cosine transform (IDCT) to transform the determined one or more DCT coefficients of the coded media data from a frequency domain to a spatial domain so as to determine residual media data, wherein the means for performing the 8-point IDCT includes:

an even portion comprising first and second internal factors (A, B) that are related to the first scaled factor (μ) in accordance with a first relationship, wherein the first relationship is defined such that the first scaled factor equals a square root of a sum of a square of the first internal factor plus a square of the second internal factor; and an odd portion comprising third, fourth, fifth and sixth internal factors (G, D, E, Z) that are related to the second scaled factor (η) in accordance with a second relationship, wherein the second relationship is defined such that the second scaled factor equals a square root of a sum of a square of the third internal factor plus a square of the fourth internal factor, and wherein the second relationship also is defined such that the second scaled factor equals a square root of a sum of a square of the fifth internal factor plus a square of the sixth internal factor.

20. The device of claim 19,
wherein the first internal factor A is set to one,
wherein the second internal factor B is set to two,
wherein the third internal factor G is set to eleven,
wherein the fourth internal factor D is set to three,
wherein the fifth internal factor E is set to nine, and
wherein the sixth internal factor Z is set to seven.

21. The device of claim 19,
wherein the first internal factor A is set to one,
wherein the second internal factor B is set to two,
wherein the third internal factor G is set to nineteen,
wherein the fourth internal factor D is set to four,
wherein the fifth internal factor E is set to sixteen, and
wherein the sixth internal factor Z is set to eleven.

22. The device of claim 19,
wherein the first internal factor A is set to two,
wherein the second internal factor B is set to five,
wherein the third internal factor G is set to eleven,
wherein the fourth internal factor D is set to three,
wherein the fifth internal factor E is set to nine, and
wherein the sixth internal factor Z is set to seven.

23. The device of claim 19,
wherein the first internal factor A is set to two,
wherein the second internal factor B is set to five,
wherein the third internal factor G is set to nineteen,
wherein the fourth internal factor D is set to four,
wherein the fifth internal factor E is set to sixteen, and
wherein the sixth internal factor Z is set to eleven.

24. The device of claim 19,
wherein the first internal factor A is set to three,
wherein the second internal factor B is set to seven,
wherein the third internal factor G is set to eleven,
wherein the fourth internal factor D is set to three,
wherein the fifth internal factor E is set to nine, and
wherein the sixth internal factor Z is set to seven.

25. The device of claim 19,
wherein the first internal factor A is set to three,
wherein the second internal factor B is set to seven,
wherein the third internal factor G is set to nineteen,
wherein the fourth internal factor D is set to four,
wherein the fifth internal factor E is set to sixteen, and
wherein the sixth internal factor Z is set to eleven.

26. The device of claim 19,
wherein the internal factors A, B, G, D, E and Z are normalized such that these internal factors become dyadic rational values,
wherein a first denominator used to normalize the internal factors A and B is a first power of two, and
wherein a second denominator used to normalize the interface factors G, D, E and Z is a second power of two.

27. A non-transitory computer-readable storage medium comprising instructions that cause a processor to:
receive coded media data with a coding device, wherein the coded media data comprises one or more of coded image data and coded video data;
apply first and second scaled factors (μ, η) to one or more quantized DCT coefficients of the coded media data to determine one or more DCT coefficients; and
perform a 8-point inverse discrete cosine transform (IDCT) with an 8-point IDCT hardware unit of the coding device to transform the determined one or more DCT coefficients of the coded media data from a frequency domain to a spatial domain so as to determine residual media data, wherein the 8-point IDCT hardware unit includes:
an even portion comprising first and second internal factors (A, B) that are related to the first scaled factor (μ) in accordance with a first relationship, wherein the first relationship is defined such that the first scaled factor equals a square root of a sum of a square of the first internal factor plus a square of the second internal factor; and
an odd portion comprising third, fourth, fifth and sixth internal factors (G, D, E, Z) that are related to the second scaled factor (η) in accordance with a second relationship,
wherein the second relationship is defined such that the second scaled factor equals a square root of a sum of a square of the third internal factor plus a square of the fourth internal factor, and
wherein the second relationship also is defined such that the second scaled factor equals a square root of a sum of a square of the fifth internal factor plus a square of the sixth internal factor.

* * * * *